(12) United States Patent
Zhang et al.

(10) Patent No.: US 6,636,952 B1
(45) Date of Patent: Oct. 21, 2003

(54) SYSTEMS AND METHODS FOR PROCESSING PACKET STREAMS IN A NETWORK DEVICE

(75) Inventors: Song Zhang, San Jose, CA (US); Anurag P. Gupta, Saratoga, CA (US); Raymond Lim, Mountain View, CA (US); Jorge Cruz-Rios, Los Altos, CA (US); Phil Lacroute, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 210 days.

(21) Appl. No.: 09/880,873

(22) Filed: Jun. 15, 2001

(51) Int. Cl.[7] .............................................. G06F 13/00
(52) U.S. Cl. ...................................... 711/154; 711/137
(58) Field of Search ................................. 711/154, 137, 711/213

(56) References Cited

U.S. PATENT DOCUMENTS 5,854,911 A * 12/1998 Watkins ...................... 712/207
5,905,725 A * 5/1999 Sindhu et al. ............... 370/389

* cited by examiner

*Primary Examiner*—Glenn Gossage
(74) *Attorney, Agent, or Firm*—Harrity & Snyder, LLP

(57) ABSTRACT

A network device includes systems and methods for processes streams of data. The network device stores data and addresses corresponding to the streams in a memory. The addresses store pointers to the data. Output logic within the network device determines whether an address is required to be fetched. When no address is required to be fetched, then data is read from the memory. When an address is required to be fetched, the address is fetched from the memory and data is read from the memory using the fetched address. To facilitate this, notifications may be stored corresponding to the streams and notification pointers may be used to identify ones of the notifications to be processed. A prefetch pointer may also be used to identify a notification with one or more associated addresses to be prefetched.

47 Claims, 21 Drawing Sheets

SYSTEMS AND METHODS FOR PROCESSING PACKET STREAMS IN A NETWORK DEVICE

BACKGROUND OF THE INVENTION

1. Field of the Invention

The present invention relates generally to transmission systems and, more particularly, to high bandwidth data transmission fetching.

2. Description of Related Art

Conventional network devices, such as routers, relay data through a network from a source to a destination. Typically, the network devices include one or more memory subsystems to temporarily buffer data while the network devices perform network-related functions, such as route processing or accounting. Sometimes the data are stored as one or more linked lists in a memory subsystem that has a long access latency.

Consider, for example, a network device that uses a linked list to store packets in a memory subsystem that has a long access latency. The head of the list is usually stored in a queue and provided to a packet reader that must traverse the list to read each packet before transmitting the packet downstream. Network requirements dictate that a packet must be completely transmitted before the next packet from the queue is transmitted. If the latency of the memory subsystem is large, the linked-list structure limits the amount of pipelining that can be used for reading a packet and limits the bandwidth of the memory system. This problem gets worse over time as the memory latencies become large relative to the bandwidth of the links.

Therefore, there exists a need for systems and methods for increasing the memory bandwidth in a network device that includes a memory subsystem with a large latency.

SUMMARY OF THE INVENTION

Systems and methods consistent with the principles of present invention address this and other needs by performing a two-level prefetch process to efficiently use the read bandwidth of a memory subsystem. The prefetch process includes prefetching multiple packets and data addresses for multiple packets in parallel.

In accordance with the principles of the invention as embodied and broadly described herein, a system that processes streams in a network device includes a memory and output logic. The memory stores data and addresses corresponding to the streams received by the network device. The addresses store pointers to the data. The output logic determines whether an address is required to be fetched. When no address is required to be fetched, the output logic reads data from the memory. When an address is required to be fetched, however, the output logic fetches the address from the memory and reads data from the memory using the fetched address.

In another implementation consistent with the principles of the invention, a method for processing streams by a network device comprises storing data and addresses corresponding to a plurality of input streams received by the network device, the address storing pointers to the data; storing, in a notification buffer pool, notifications corresponding to the input streams; storing notification pointers that identify ones of the notifications in the notification buffer pool to be processed; providing one or more prefetch pointers that identify one or more of the notification pointers that identify notifications that have an associated stored address; storing, in a notification buffer, notifications from the notification buffer pool that are identified by the notification pointers; storing address pointers to the stored addresses that correspond to the notifications stored in the notification buffer; determining whether any additional address pointers can be stored; and storing one or more address pointers to the addresses associated with the notifications and corresponding to the one or more prefetch pointers when additional address pointers can be stored.

In a further implementation consistent with the principles of the invention, a network device comprises a memory and output logic. The memory is configured to store data cells and address cells corresponding to a plurality of packets of different size in a plurality of input streams received by the network device. At least some of the data cells have associated address cells. The address cells store pointers to the data cells. The output logic is configured to determine whether a packet has an associated address cell based on the size of the packet, prefetch address cells from the memory for packets having associated address cells, and read data cells from the memory using the prefetched address cells.

In another implementation consistent with the principles of the invention, an apparatus that retrieves transmission data includes a memory, an address buffer, and output logic. The memory stores data for transmission and addresses identifying data for transmission. The address buffer stores at least one pointer to the addresses. The output logic initiates processes of reading out transmission data from memory, transfers a first pointer to the address buffer, the first pointer being associated with an initiated process of reading transmission data from the memory, reads from the memory one of the addresses using the first pointer from the address buffer, and reads the data identified by the one address from the memory.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents of the recited claim limitations.

Systems and methods consistent with the principles of the invention provide a two-level prefetch process that provides efficient use of the memory of a network device. The prefetch process prefetches multiple packets of a packet stream into one or more separate buffers. The prefetch process also prefetches data addresses for the prefetched packets of the packet stream. By prefetching the packets and data addresses, the systems and methods can increase the efficiency of the network device and permit the network device to support faster communication line rates.

Exemplary Network Device Configuration

Figure 1:
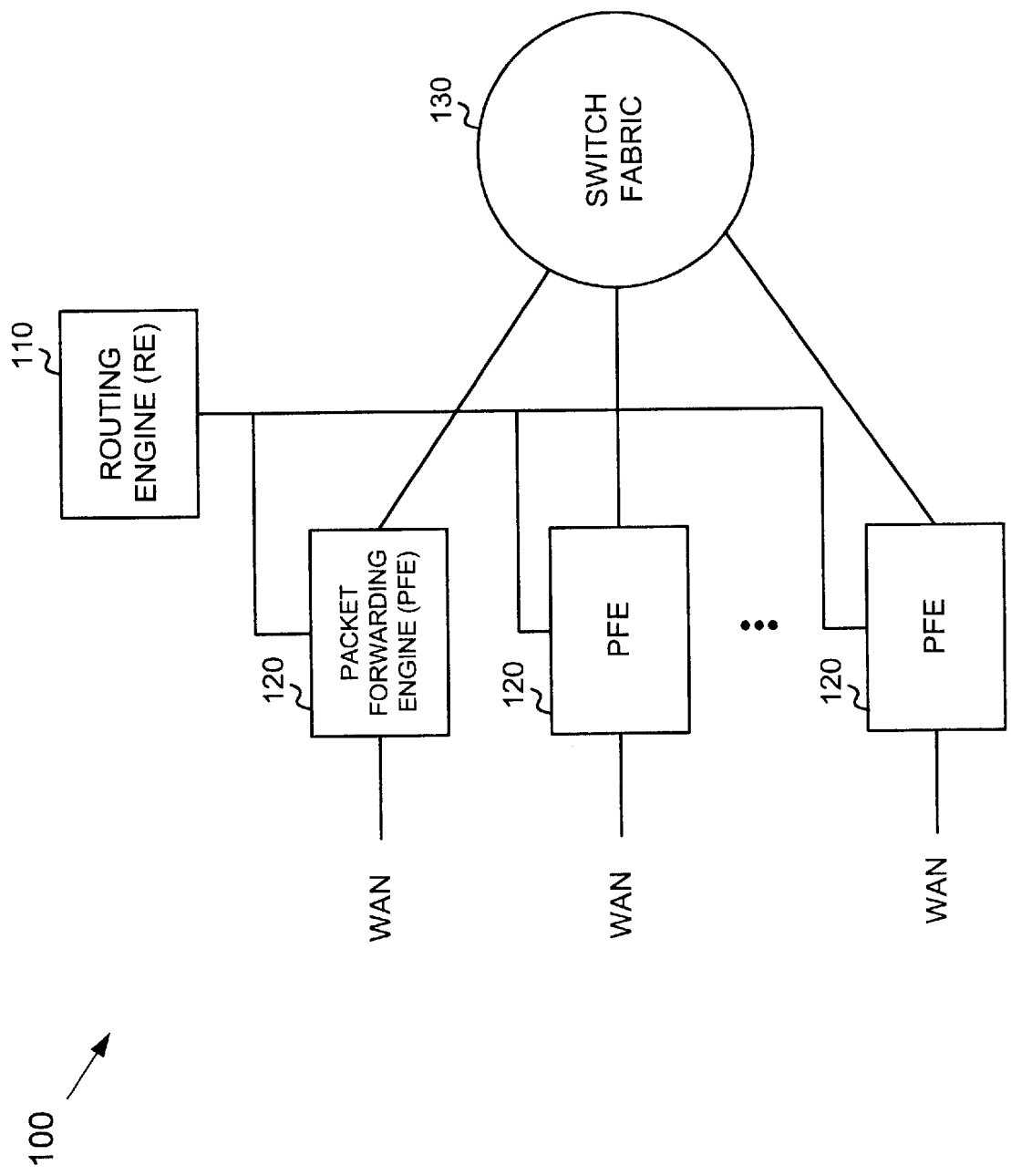
FIG. 1 is a diagram of an exemplary network device in which systems and methods consistent with the principles of the invention may be implemented.

FIG. 1 is a diagram of an exemplary network device in which systems and methods consistent with the principles of the invention may be implemented. In this particular implementation, the network device takes the form of a router 100. Router 100 may receive one or more data streams from a physical link, process the data stream(s) to determine destination information, and transmit the data stream(s) on one or more links in accordance with the destination information.

Router 100 may include a routing engine (RE) 110 and multiple packet forwarding engines (PFEs) 120 interconnected via a switch fabric 130. Switch fabric 130 may include one or more switching planes to facilitate communication between two or more of PFEs 120. In an implementation consistent with the principles of the invention, each of the switching planes includes a three-stage switch of crossbar elements.

RE 110 may include processing logic that performs high level management functions for router 100. For example, RE 110 may communicate with other networks and systems connected to router 100 to exchange information regarding network topology. RE 110 may create routing tables based on the network topology information and forward the routing tables to PFEs 120. PFEs 120 may use the routing tables to perform route lookup for incoming packets. RE 110 may also perform other general control and monitoring functions for router 100.

Each of PFEs 120 connects to RE 110 and switch fabric 130. PFEs 120 receive data on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard or Ethernet.

Figure 2:
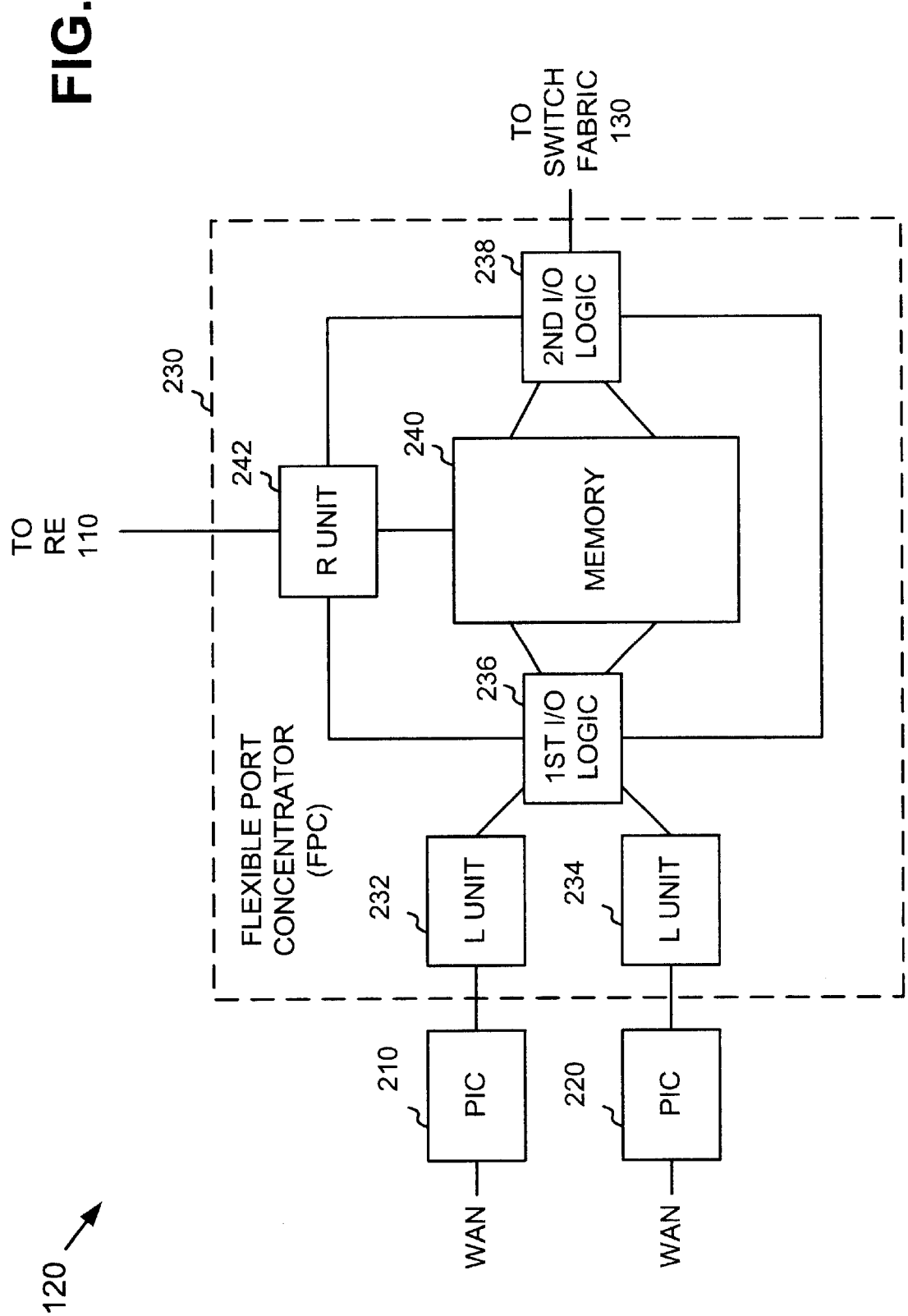
FIG. 2 is an exemplary diagram of a packet forwarding engine (PFE) of FIG. 1 according to an implementation consistent with the principles of the invention.

FIG. 2 is an exemplary diagram of a PFE 120 according to an implementation consistent with the principles of the invention. PFE 120 may include physical interface cards (PICs) 210 and 220 connected to a flexible port concentrator (FPC) 230. While two PICs 210 and 220 are shown in FIG. 2, there may be more or fewer PICs in other implementations consistent with the principles of the invention.

PICs 210 and 220 connect to WAN physical links and FPC 230 and transport data between the WAN and FPC 230. Each of PICs 210 and 220 includes interfacing, processing, and memory elements necessary to transmit data between a WAN physical link and FPC 230. Each of the PICs 210 and 220 is designed to handle a particular type of physical link. For example, a particular PIC may be provided to handle Ethernet communications.

For incoming data, PICs 210 and 220 may strip off layer 1 (L1) protocol information and forward the remaining data, in the form of raw packets, to FPC 230. For outgoing data, PICs 210 and 220 may receive packets from FPC 230, encapsulate the packets in L1 protocol information, and transmit the data on the physical WAN link.

FPC 230 performs packet transfers between PICs 210 and 220 and switch fabric 130. For each packet it handles, FPC 230 may perform route lookup based on packet header information to determine destination information and send the packet either to PIC 210 and 220 or switch fabric 130, depending on the destination information.

FPC 230 may include L units 232 and 234, first input/output (I/O) logic 236, second input/output (I/O) logic 238, memory 240, and R unit 242. Each of L units 232 and 234 corresponds to one of PICs 210 and 220. L units 232 and 234 may process packet data flowing between PICs 210 and 220, respectively, and first I/O logic 236. Each of L units 232 and 234 may operate in two modes: a first mode for processing packet data received from PIC 210 or 220 connected to it, and a second mode for processing packet data received from first I/O logic 236.

In the first mode, L unit 232 or 234 may process packets from PIC 210 or 220, respectively, convert the packets into data (D) cells, and transmit the D cells to first I/O logic 236. D cells are the data structure used internally by FPC 230 for transporting and storing data within router 100. In one implementation, D cells are 64 bytes in length.

Packets received by L unit 232 or 234 may include two portions: a header portion and a packet data portion. For each packet, L unit 232 or 234 may process the header and insert the results of the processing into a notification. A notification may include packet header information and, possibly, other packet-related information. For example, L unit 232 or 234 may parse L2 and L3 headers of incoming packets to form a notification. The notification might include some of the original header information, processed header information, and/or other information regarding the packet. L unit 232 or 234 may also create control information based on the packet. The control information may be based on the packet header, the packet data, or both. L unit 232 or 234 may then store the notification, control information, and the packet data in D cells, which it sends to first I/O logic 236.

In the second mode, L unit 232 or 234 handles data flow in the direction opposite the first mode. In the second mode, L unit 232 or 234 receives D cells from first I/O logic 236, extracts the notification, control information, and packet data from the D cells, and creates a packet based on the extracted information. L unit 232 or 234 creates the packet header from the notification and possibly the control information from the D cells. In one implementation, L unit 232 or 234 creates L2 and L3 header information based on the notification and control information. L unit 232 or 234 may load the packet data portion with the packet data from the D cells.

First I/O logic 236 and second I/O logic 238 coordinate data transfers into and out of FPC 230. First I/O logic 236 receives D cells from L units 232 and 234, and second I/O logic 238 receives D cells from switch fabric 130. Upon receiving D cells for a packet, I/O logic 236/238 extracts the notification and creates a key based on the notification.

First I/O logic 236 and second I/O logic 238 store the D cells in memory 240. The location of each D cell is stored in the notification. In one implementation, instead of storing addresses in the notification, only the address of the first D cell is stored in the notification, and the remaining D cell locations are identified in the notification by offsets from the first address. If the notification cannot store all the D cell addresses, the overflow D cell addresses are stored in memory 240 in indirect address cells (I cells). After storing the D cells and I cells for a packet in memory 240, first I/O logic 236 and second I/O logic 238 send a notification and key to R unit 242. While first I/O logic 236 and second I/O logic 238 are shown as separate units, they may be implemented as a single unit in other implementations consistent with the principles of the invention.

R unit 242 may include processing logic that provides route lookup, accounting, and policing functionality. R unit 242 may receive one or more routing tables from RE 110 (FIG. 1) and use the routing table(s) to perform route lookups. R unit 242 may insert the lookup result into a notification received from first I/O logic 236 or second I/O logic 238, which it may store in memory 240.

Figure 3:
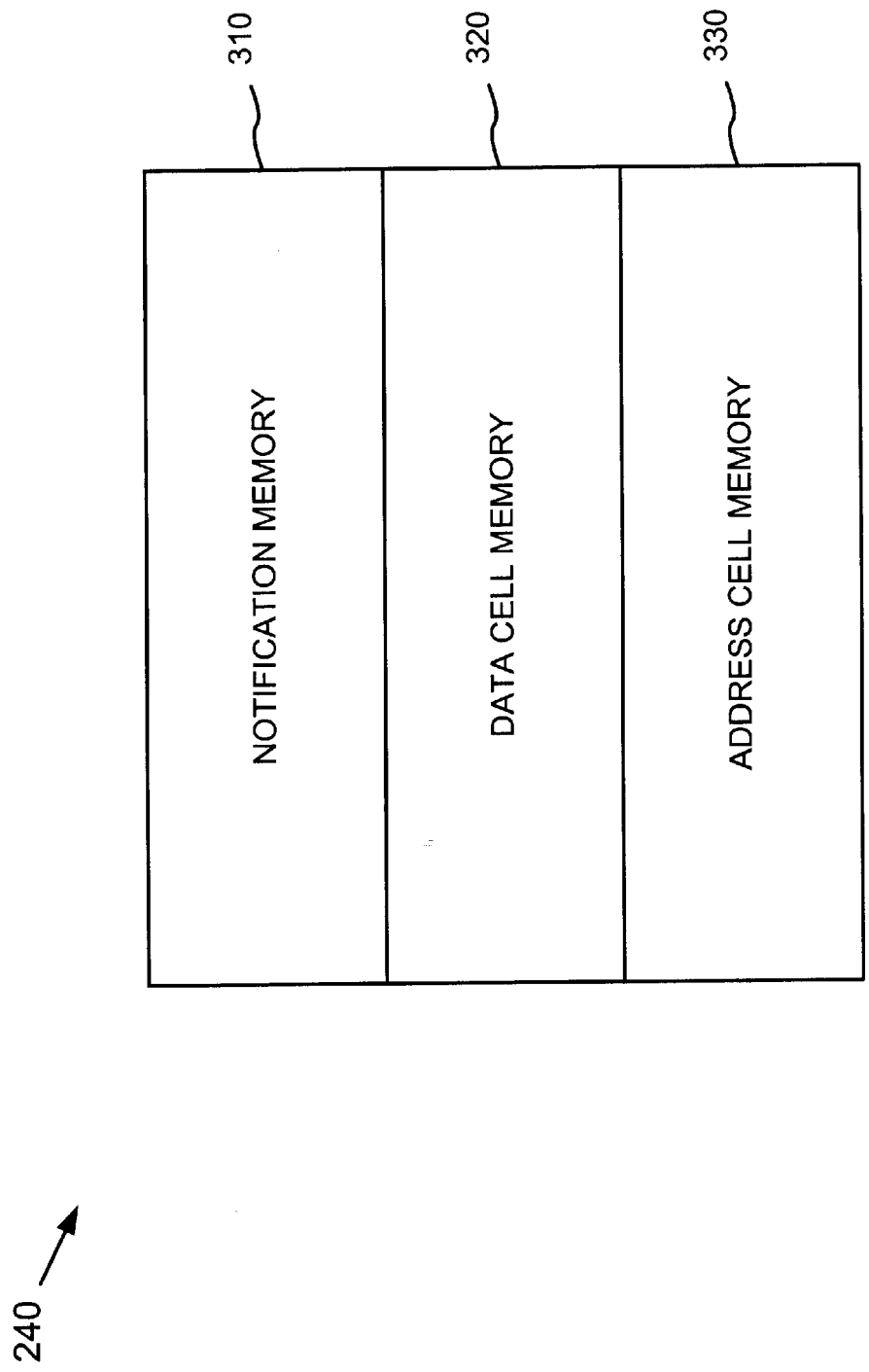
FIG. 3 is an exemplary diagram of the memory of FIG. 2 according to an implementation consistent with the principles of the invention.

Memory 240 may temporarily store data from first I/O logic 236 and second I/O logic 238 and notifications from R unit 242. FIG. 3 is an exemplary diagram of memory 240 according to an implementation consistent with the principles of the invention. Memory 240 may be implemented as one or more memory devices and may include a notification memory 310, a data cell memory 320, and an address cell memory 330.

Figure 4:
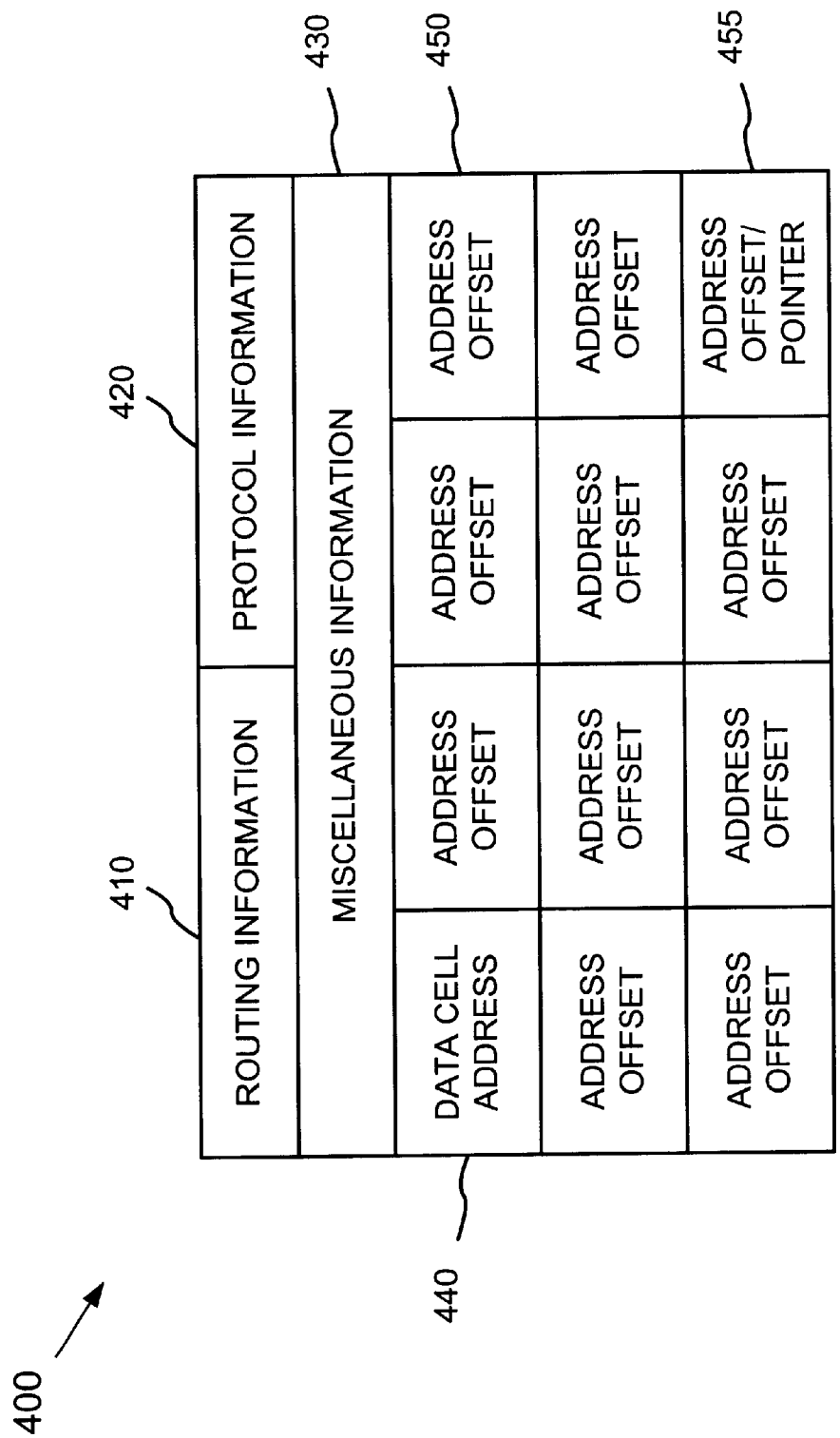
FIG. 4 is an exemplary diagram of a notification according to an implementation consistent with the principles of the invention.

Notification memory 310 may store notifications from R unit 242. FIG. 4 is an exemplary diagram of a notification 400 according to an implementation consistent with the principles of the invention. Notification 400 may include several fields, such as a routing information field 410, a protocol information field 420, miscellaneous information field 430, a data cell address field 440, and address offset fields 450. Routing information field 410 may store information regarding a source, destination, input and output PICs, etc. of a packet. Protocol information field 420 may store information regarding the protocol associated with the packet. Miscellaneous information field 430 may store other packet-related control information, such as quality of service (QoS), validity, priority, and length data.

Data cell address field 440 may store an actual address of a data cell stored in data cell memory 320. Address offset fields 450 store data that identify the addresses of the remaining data cells for the packet in data cell memory 320 based on their relationship to the actual address, or as offsets of the actual address. In another implementation consistent with the principles of the invention, address offset fields 450 store actual addresses of data cells in data cell memory 320.

One of address offset fields 450 (identified as address offset/pointer field 455) may store an address offset, similar to address offset fields 450, or a pointer to an I cell in address cell memory 330. Whether address offset/pointer field 455 stores an address offset or a pointer may be based on the size of the corresponding packet. For example, for large packets (i.e., packets having more data cells than the number of address offsets 450 in notification 400), address offset/pointer field 455 may store a pointer to an I cell in address cell memory 330. For small packets (i.e., packets having fewer data cells than the number of available address offsets 450 in notification 400), on the other hand, address offset/pointer field 455 may store an address offset, if necessary, as described above.

Returning to FIG. 3, data cell memory 320 may store data cells of a packet. In an implementation consistent with the principles of the invention, the data cells of a packet are stored at non-contiguous locations within data cell memory 320.

Address cell memory 330 may store I cells that contain addresses (or address offsets) of data cells stored in data cell memory 320. A packet may have associated I cells when the number of data cells of the packet exceeds the number of address offsets 450 (FIG. 4) in notification 400.

Figure 5:
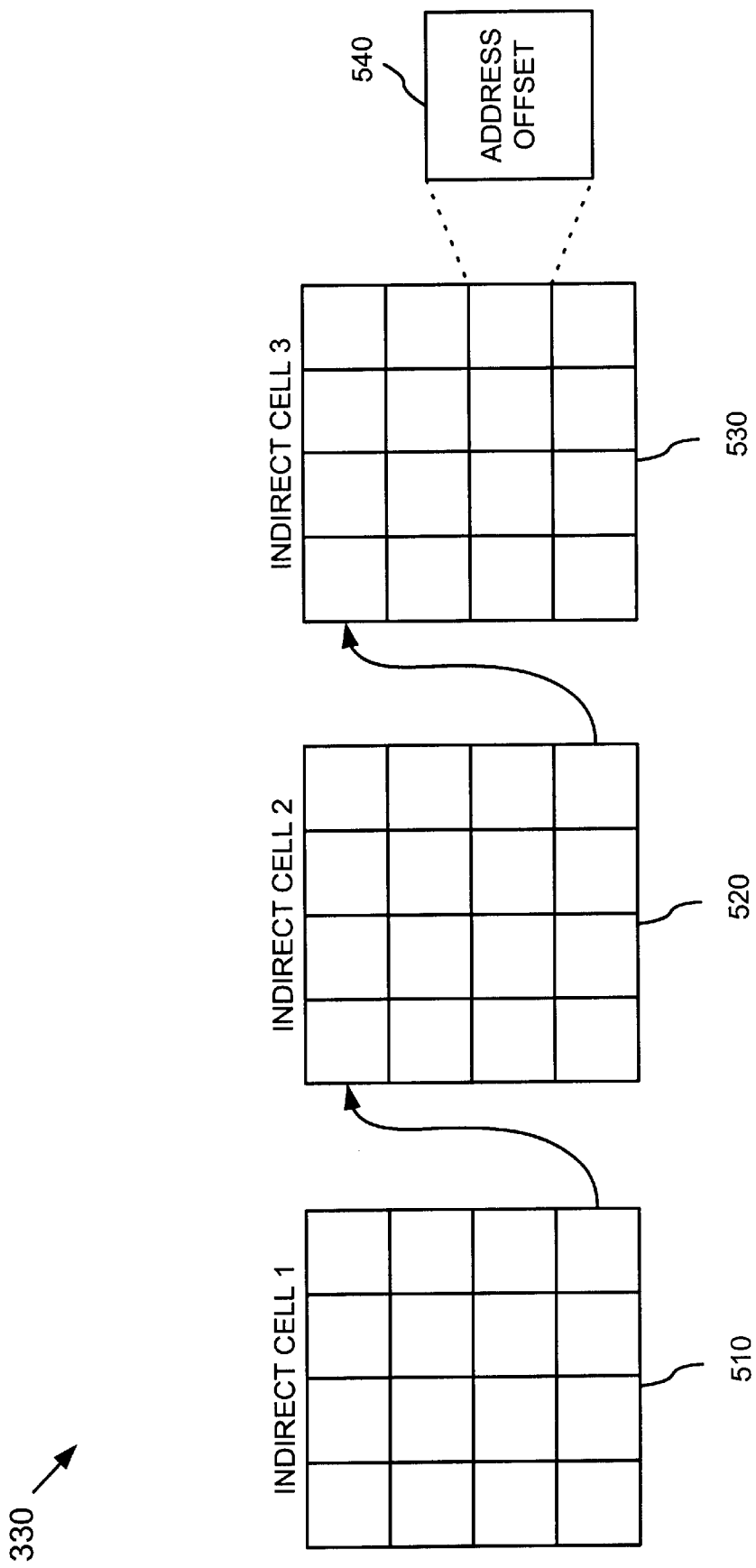
FIG. 5 is exemplary diagram of the address cell memory of FIG. 3 according to an implementation consistent with the principles of the invention.

The I cells may be stored as a linked list within address cell memory 330. FIG. 5 is an exemplary diagram of address cell memory 330 according to an implementation consistent with the principles of the invention. Address cell memory 330 may include multiple I cells, such as I cells 510–530. While three I cells 510–530 are shown in FIG. 5, there may be more or less I cells in other implementations consistent with the principles of the invention.

Each of I cells 510–530 may store multiple address offsets 540. Address offset 540 may store an address of one of the data cells within data cell memory 320 as an offset from the address of a first data cell in a particular packet (as identified by data cell address 440 in notification 400 in FIG. 4).

Figure 6:
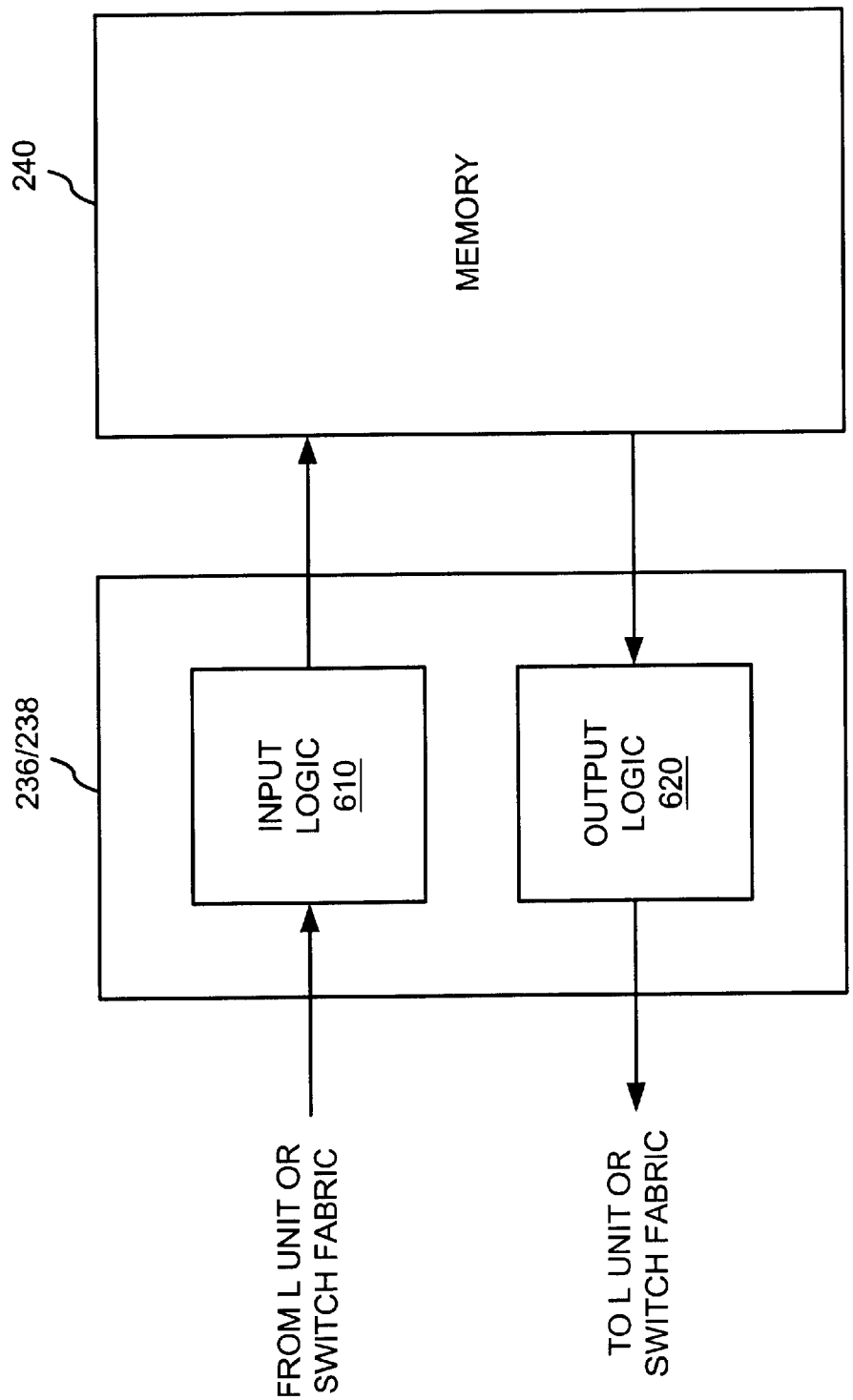
FIG. 6 is an exemplary diagram of a portion of the first I/O logic and the second I/O logic of FIG. 2 according to an implementation consistent with the principles of the invention.

FIG. 6 is an exemplary diagram of a portion of first I/O logic 236 and second I/O logic 238 according to an implementation consistent with the principles of the invention. Each of logic 236 and 238 includes input logic 610 and output logic 620. Input logic 610 receives D cells from L units 232 or 234 or from switch fabric 130 and writes the D cells to memory 240. More particularly, input logic 610 may extract information from the D cells, write the D cells to memory 240, store in a notification the address offsets identifying where the D cells were stored, and send the extracted information and the notification to R unit 242.

Output logic 620 handles data transfer in the opposite direction of input logic 610. Generally, output logic 620 receives notifications from memory 240, reads D cells from memory 240 based on the notifications, and transfers the D cells to L units 232 and 234. Alternatively, output logic 620 may transfer the D cells to switch fabric 130.

Figure 7:
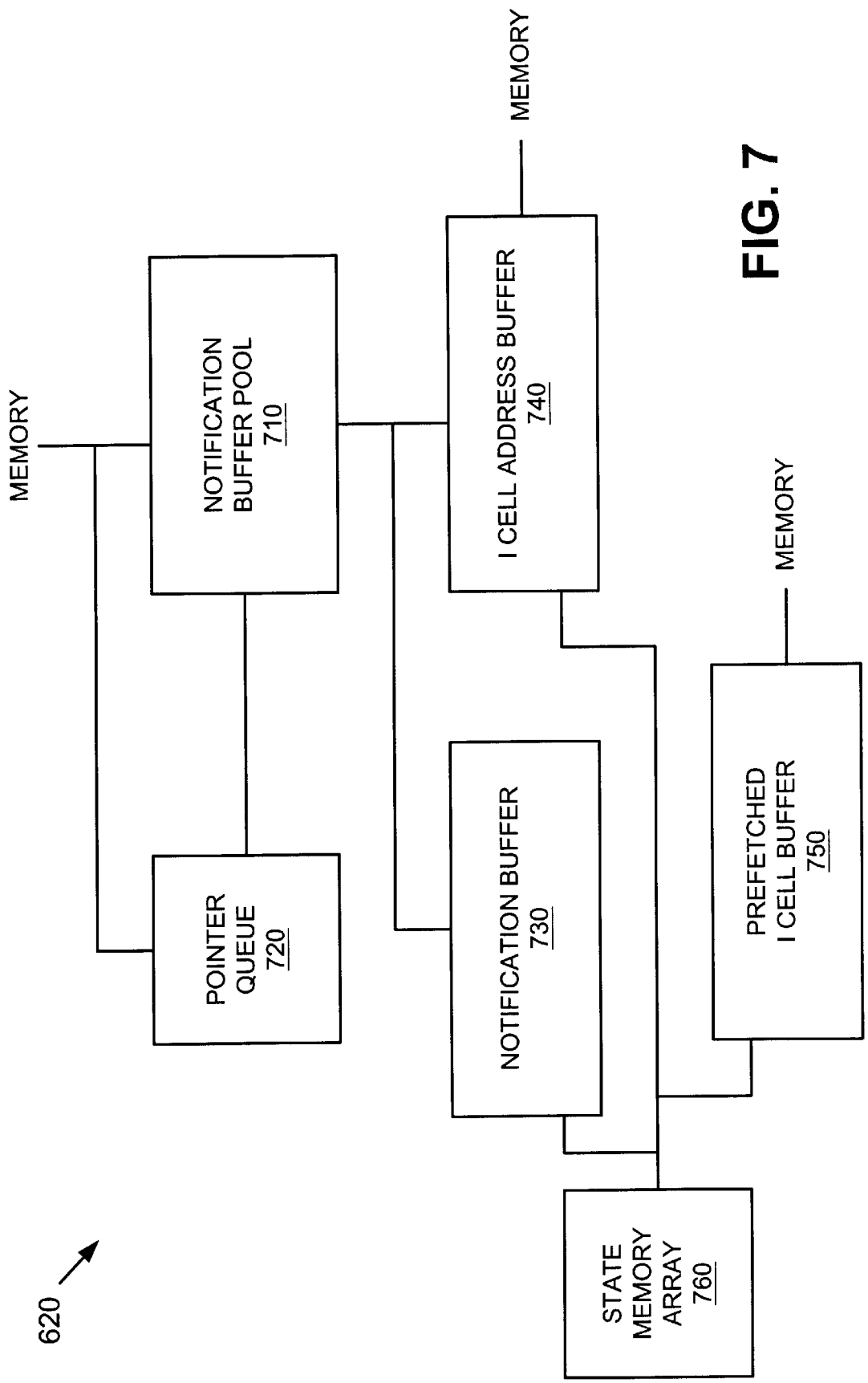
FIG. 7 is an exemplary diagram of the output logic of FIG. 6 according to an implementation consistent with the principles of the invention.

FIG. 7 is an exemplary diagram of output logic 620 according to an implementation consistent with the principles of the invention. Output logic 620 may include a notification buffer pool 710, a pointer queue 720, a notification buffer 730, an I cell address buffer 740, a prefetched I cell buffer 750, and a state memory array 760. Notification buffer pool 710 may include one or more memory devices that store notifications from memory 240. The notifications may be stored in any location in notification buffer pool 710.

Figure 8:
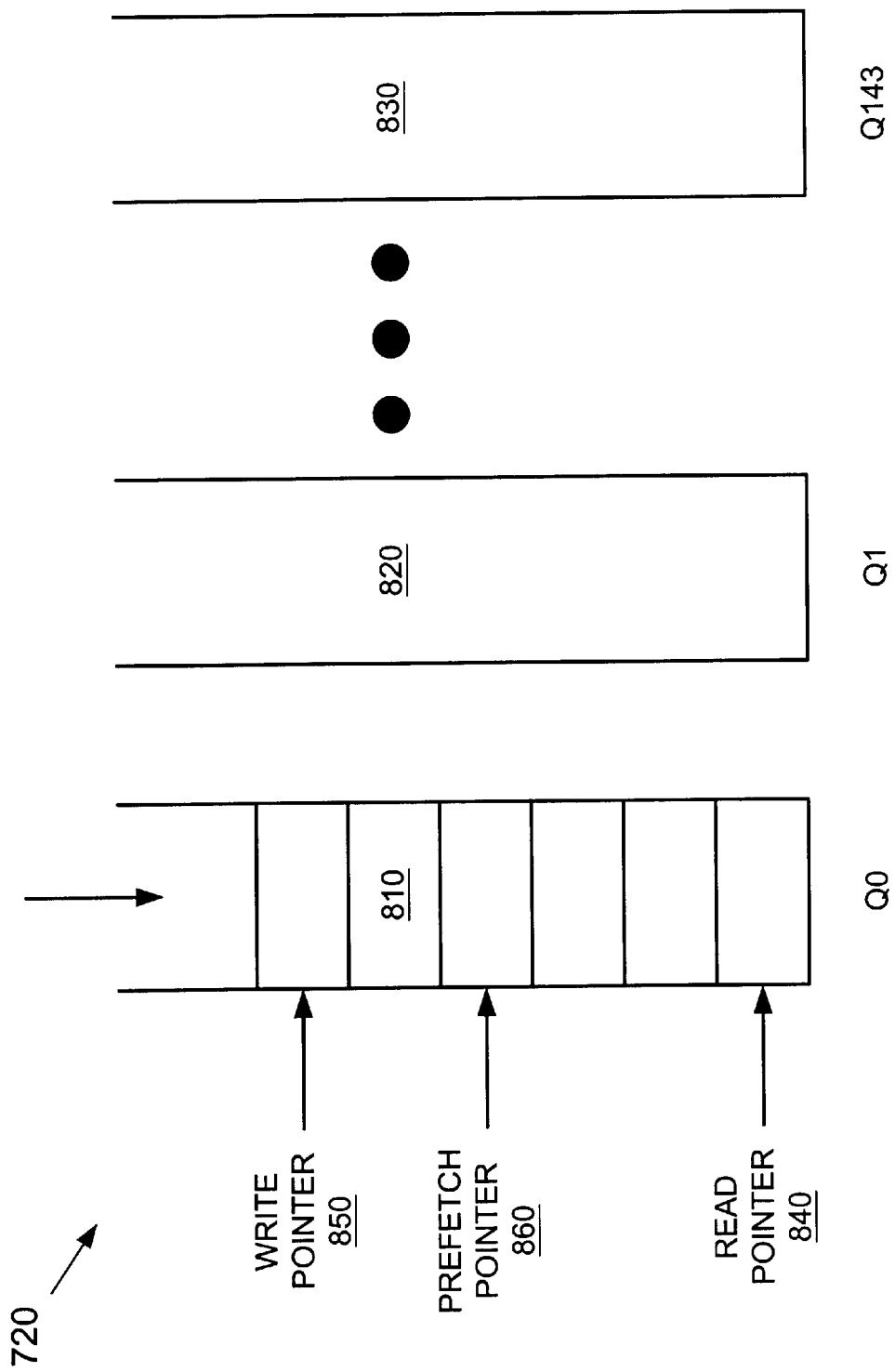
FIG. 8 is an exemplary diagram of the pointer queue of FIG. 7 according to an implementation consistent with the principles of the invention.

Pointer queue 720 may store pointers to the notifications in notification buffer pool 710. FIG. 8 is an exemplary diagram of pointer queue 720 according to an implementation consistent with the principles of the invention. Pointer queue 720 may include first-in, first-out (FIFO) buffers 810–830 that correspond to one of 144 possible streams of packets. In other implementations, pointer queue 720 may include different numbers of FIFO buffers 810–830 with each of FIFO buffers 810–830 corresponding to other numbers of possible streams of packets.

Each of FIFO buffers 810–830 may include multiple locations that store notification pointers and possibly state bits corresponding to packets in the particular packet stream. A notification pointer may identify the location of a notification stored in notification buffer pool 710. The state bit may identify whether the notification identified by the notification pointer corresponds to a packet with I cells. Each of FIFO buffers 810–830 may maintain the order of packets in a particular stream by storing notification pointers in the order in which their corresponding packets were received by router 100.

Pointer queue 720 may also include a read pointer 840, a write pointer 850, and a prefetch pointer 860 for each queue. Read pointer 840 identifies the FIFO location of the next notification pointer to be operated upon. Write pointer 850 identifies the FIFO location at which a newly received notification pointer is to be stored. Prefetch pointer 860 identifies the FIFO location of a notification that corresponds to a next packet with I cells to be prefetched (described in more detail below).

Figure 9:
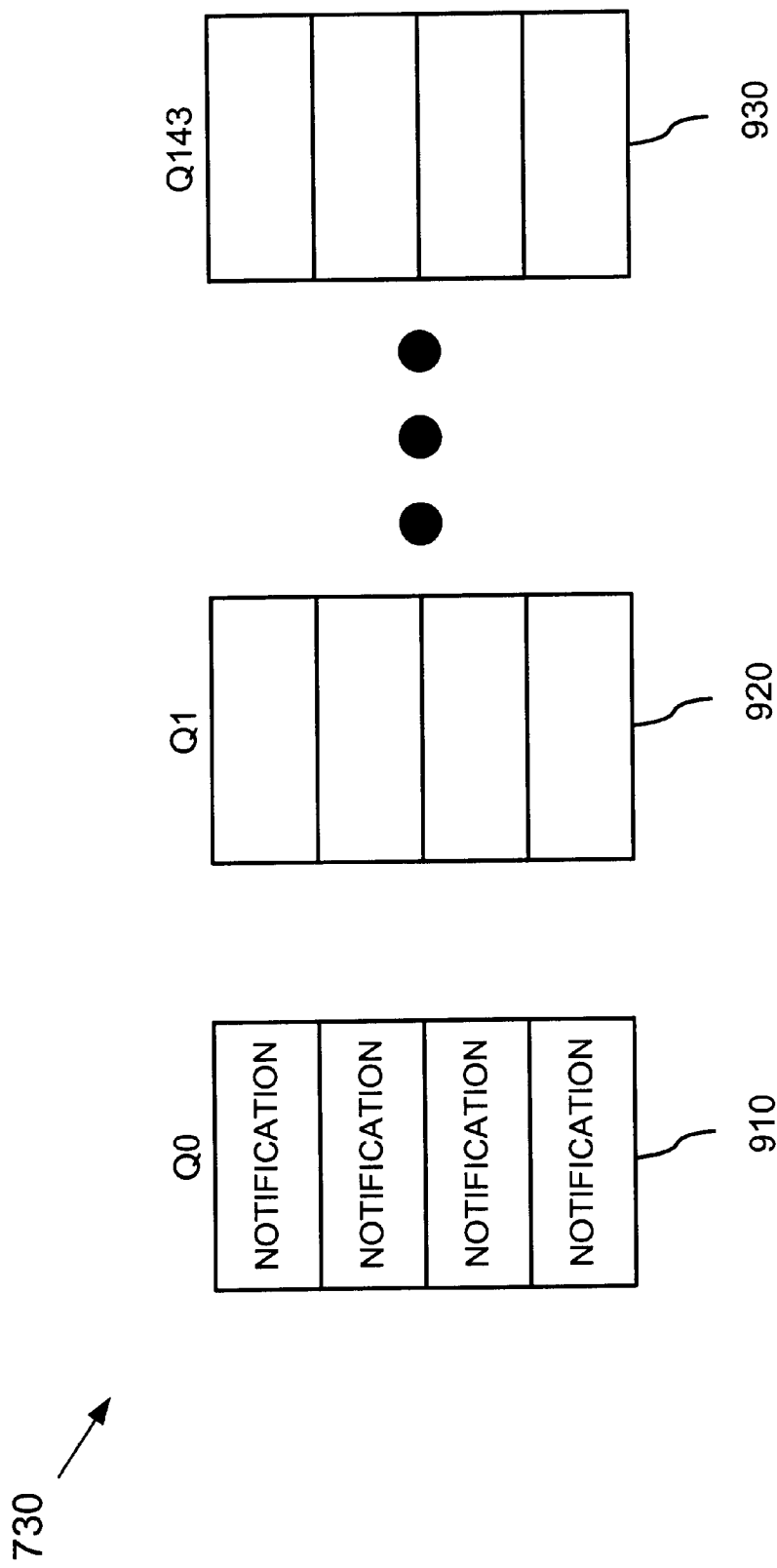
FIG. 9 is an exemplary diagram of the notification buffer of FIG. 7 according to an implementation consistent with the principles of the invention.

Returning to FIG. 7, notification buffer 730 stores notifications for packets. FIG. 9 is an exemplary diagram of notification buffer 730 according to an implementation consistent with the principles of the invention. Notification buffer 730 may include FIFO buffers 910–930. Each of FIFO buffers 910–930, in the exemplary implementation, corresponds to one of the 144 possible streams of packets. FIFO buffers 910–930 store notifications from notification buffer pool 710 based on notification pointers in pointer queue 720. In the implementation shown in FIG. 9, FIFO buffers 910–930 are four deep (i.e., buffers 910–930 are capable of storing four notifications). In other implementations, the capacity of FIFO buffers 910–930 may be larger or smaller.

Figure 10:
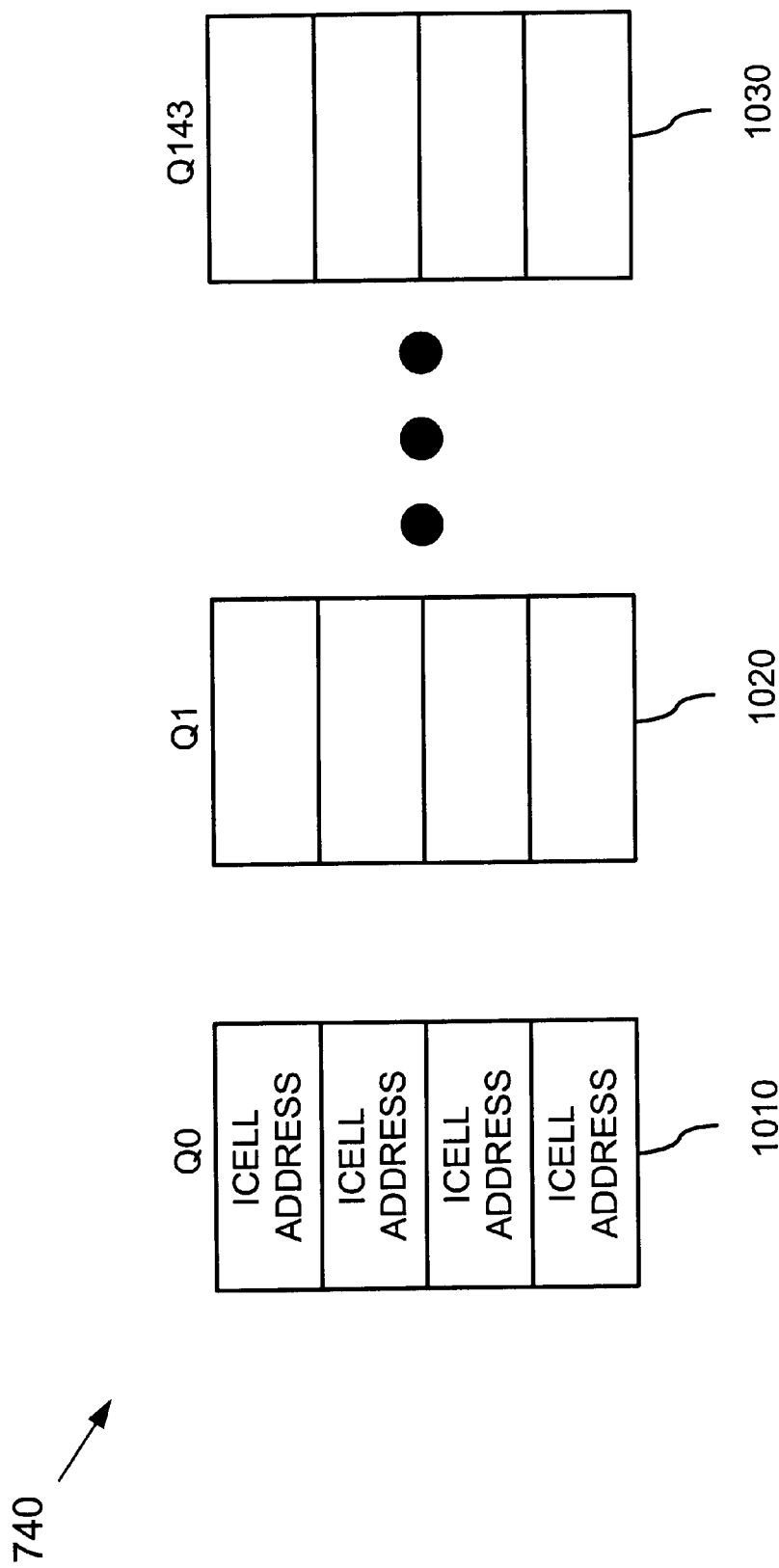
FIG. 10 is an exemplary diagram of the I cell address buffer of FIG. 7 according to an implementation consistent with the principles of the invention.

Returning to FIG. 7, I cell address buffer 740 stores I cell addresses for packets that will be output by output logic 620. FIG. 10 is an exemplary diagram of I cell address buffer 740 according to an implementation consistent with the principles of the invention. I cell address buffer 740 may include FIFO buffers 1010–1030. Each of FIFO buffers 1010–1030, in the exemplary implementation, corresponds to one of the 144 possible streams of packets. FIFO buffers 1010–1030 store I cell addresses corresponding to notifications in notification buffer 730 and notifications referenced by prefetch pointers 860 (FIG. 8) in pointer queue 720. In the implementation shown in FIG. 10, FIFO buffers 1010–1030 are four deep (i.e., buffers 1010–1030 are capable of storing four I cell addresses). In other implementations, the capacity of FIFO buffers 1010–1030 may be larger or smaller.

Figure 11:
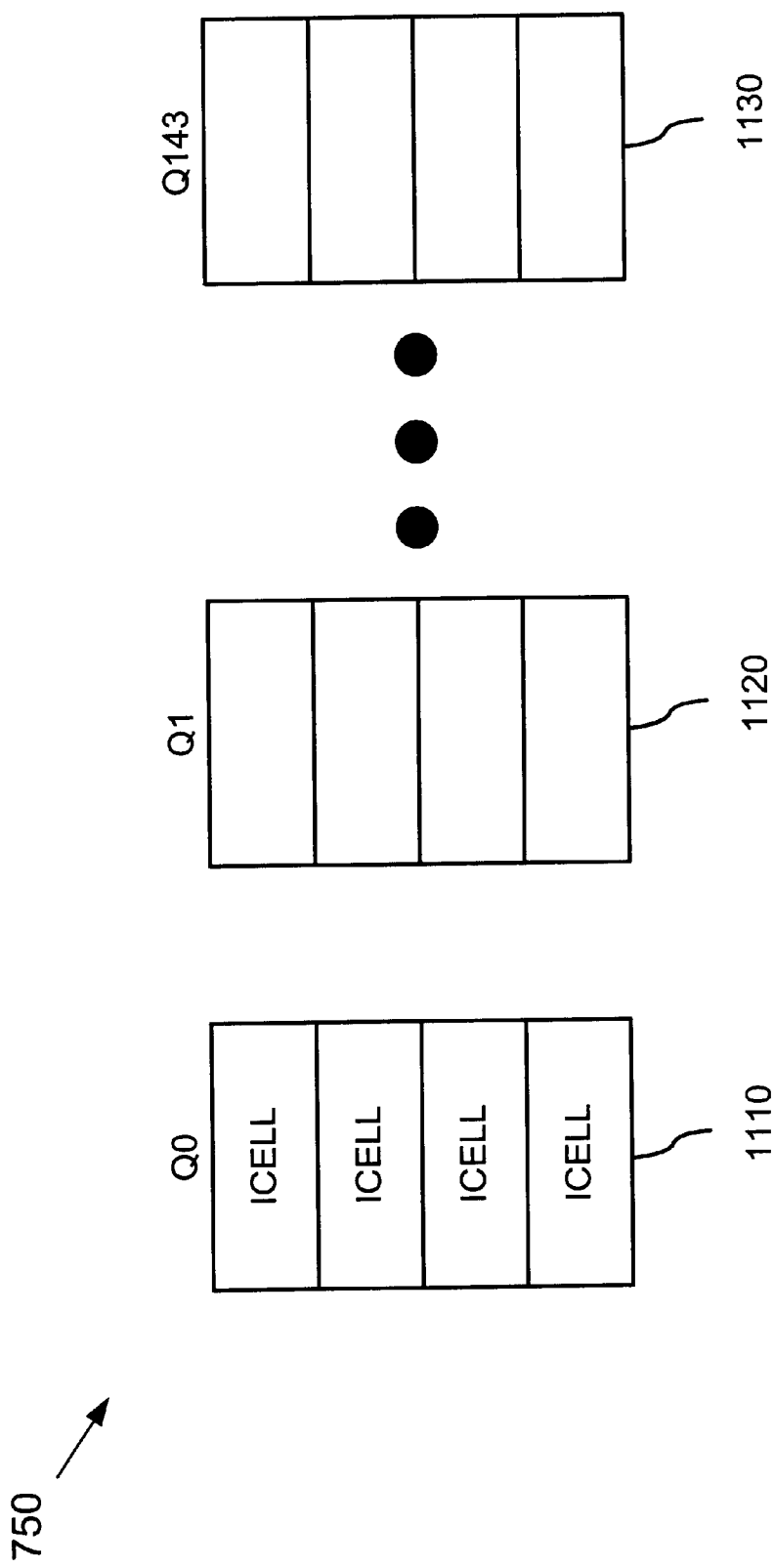
FIG. 11 is an exemplary diagram of the prefetched I cell buffer of FIG. 7 according to an implementation consistent with the principles of the invention.

Returning to FIG. 7, prefetched I cell buffer 750 stores I cells retrieved from memory 240 identifying the D cells that will be output by output logic 620 for a particular packet. FIG. 11 is an exemplary diagram of prefetched I cell buffer 750 according to an implementation consistent with the principles of the invention. Prefetched I cell buffer 750 may include FIFO buffers 1110–1130. Each of FIFO buffers 1110–1130, in the exemplary implementation, corresponds to one of the 144 possible streams of packets. FIFO buffers 1110–1130 store I cells that have been prefetched using I cell addresses from I cell address buffer 740. In the implementation shown in FIG. 11, FIFO buffers 1110–1130 are four deep (i.e., buffers 1110–1130 are capable of storing four I cells). In other implementations, the capacity of FIFO buffers 1110–1130 may be larger or smaller.

Returning to FIG. 7, state memory array 760 may include one or more tables that track the operation of output logic 620. For example, state memory array 760 may store per-stream information. The information may include read and write pointers for notification buffer 730, I cell address buffer 740, and possibly prefetched I cell buffer 750, valid bits for entries in notification buffer 730 and I cell address buffer 740, and prefetch bits for entries in I cell address buffer 740. Using the information in state memory array 760, the performance of output logic 620 may be optimized to perform operations concurrently and take full advantage of the memory resources.

Output logic 620 maximizes efficiency and throughput by concurrently processing multiple packets in a packet stream, concurrently processing multiple packet streams, prefetching I cells for packets with I cells, and when a notification is queued for a packet without I cells, prefetching I cells for one or more subsequent packets.

Exemplary Network Device Processing

Figure 12:
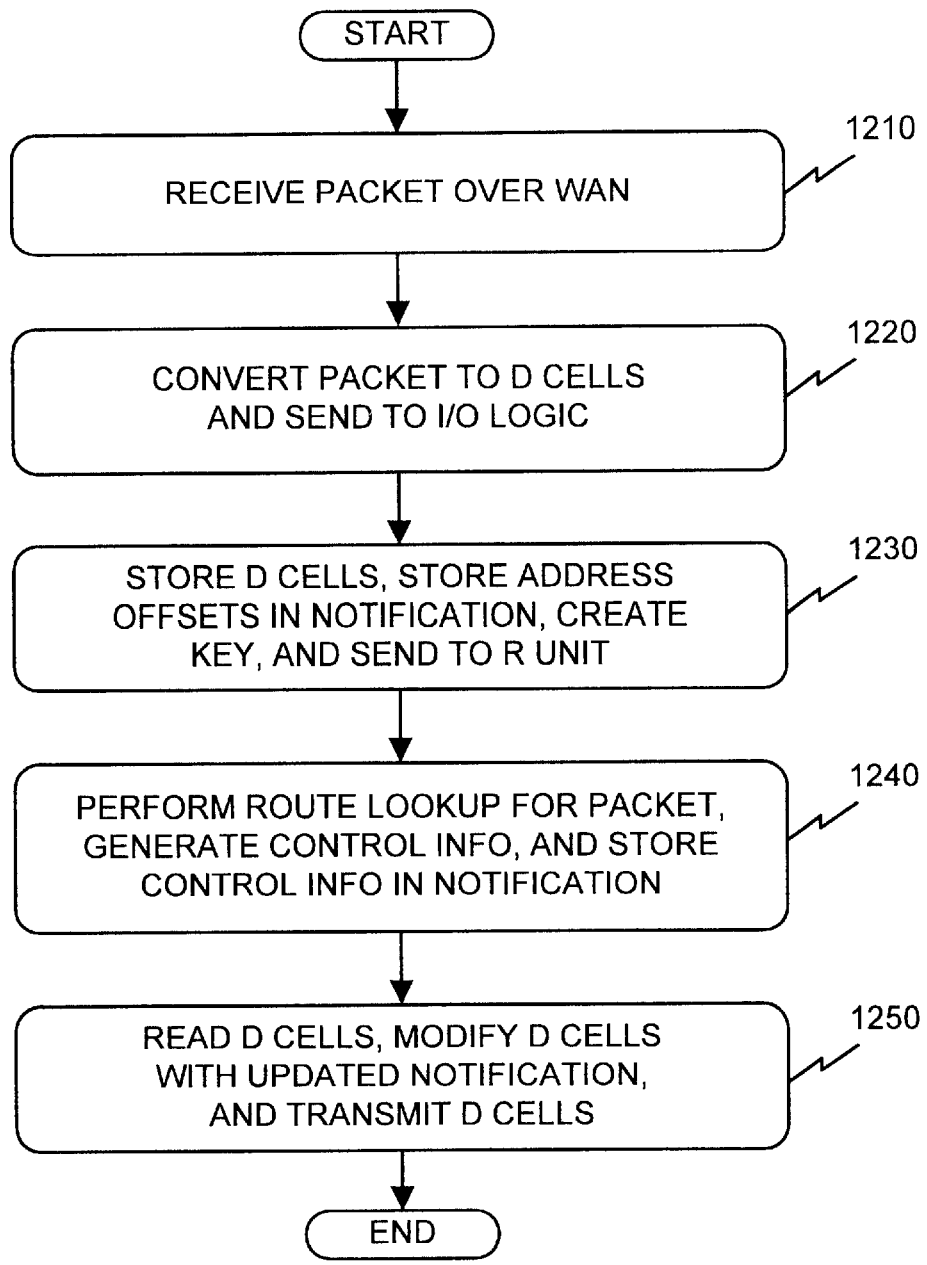
FIGS. 12 and 13 are flowcharts of exemplary processing of a packet by the network device of FIG. 1 according to an implementation consistent with the principles of the invention.
Figure 13:
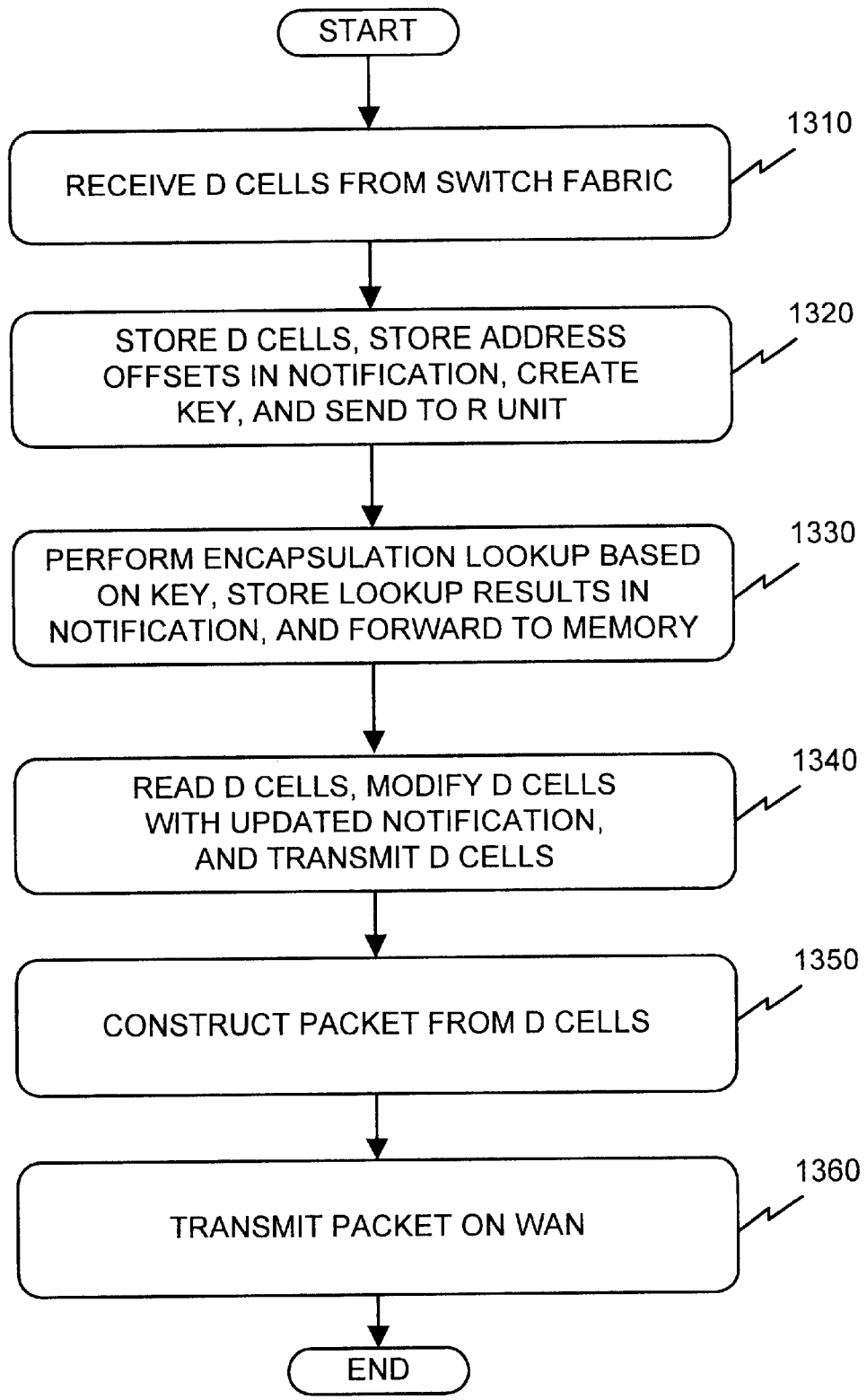

FIGS. 12 and 13 are flowcharts of exemplary processing of a packet by a network device, such as router 100 of FIG. 1, according to an implementation consistent with the principles of the invention. Processing may begin with a PIC, such as PIC 210, receiving data over a transmission medium, such as a WAN [act 1210]. PIC 210 may strip off layer I (L1) protocol information leaving raw packets. The packets may be part of several packets in a stream of packets transmitted between a source and a destination.

L unit 232 may convert the packets into D cells and send the D cells to first I/O logic 236 [act 1220]. For example, L unit 232 may divide the data of the packet into units of fixed size, such as 64 bytes, for storing in the D cells. L unit 232 may also process the header of the packet, such as layer 2 (L2) and layer 3 (L3) headers, to form a notification. Further, L unit 232 might create control information based on the packet. L unit 232 may store the notification and the control information in the D cells that it sends to first I/O logic 236.

First I/O logic 236 may write the D cells containing packet data into memory 240 [act 1230]. First I/O logic 236 may store the D cells in non-contiguous locations in memory 240 and identify the respective addresses of the D cells as a function of their relationship (offset) to first D cell in the packet. First I/O logic 236 may store the address offsets in a notification, create a key based on, for example, the notification and send the notification and key to R unit 242 [act 1230]. If there are more address offsets than will fit in the notification, first I/O logic 236 may store these additional offsets as one or more I cells in the address cell memory 330 in memory 240.

R unit 242 may perform route lookup for the packet using the key and the routing table(s) from RE 110 (FIG. 1) [act 1240]. For example, R unit 242 may analyze the routing table(s) using information in the key to identify the PIC from which the packet is to be transmitted. R unit 242 may generate control information based on the route lookup and store the control information in the notification [act 1240]. R unit 242 may then write the notification in memory 240.

The D cells are later read out by first I/O logic 236 or second I/O logic 238 based on the notification from memory 240 [act 1250]. The D cells are modified with the updated notification and transmitted to L unit 232, L unit 234, or to another PFE via switch fabric 130 [act 1250]. For example, in the embodiment of FIG. 2, second I/O logic 238 may use data cell addresses 440 (FIG. 4) in the notification to read the D cells from memory 240, and then transmit the D cells to switch fabric 130. Switch fabric 130 transmits the D cells to another PFE 120 (hereinafter "receiving PFE").

Second I/O logic 238 of receiving PFE 120 may receive D cells from switch fabric 130 [act 1310] (FIG. 13). Second I/O logic 238 may write the D cells to memory 240. Second I/O logic 238 may store the D cells in non-contiguous locations in memory 240 and identify the addresses of the D cells as a function of their relationship (e.g., offset) to the first D cell in the packet. Second I/O logic 238 may store the address offsets in the notification and create a key based on the notification [act 1320].

The notification and key are sent to R unit 242. R unit 242 uses the key to perform an encapsulation lookup to determine information needed for preparing the packet for transfer out of the system, and stores the results of the encapsulation lookup in the notification [act 1330]. R unit 242 also forwards the updated notification to memory 240, [act 1330].

First I/O logic 236 may subsequently read the D cells from memory 240 based on the notification, modify the D cells with the updated notification, and transmit the D cells to an L unit, such as L unit 234 [act 1340]. First I/O logic 236 may use D cell addresses 440 (FIG. 4) in the notification to read the D cells from memory 240. First I/O logic 236 may also transfer the D cells to L unit 234 for further processing.

L unit 234 may construct a packet from the D cells and send the packet to PIC 220 [act 1350]. For example, L unit 234 may extract the notification, control information, and packet data from the D cells and create a packet therefrom. L unit 234 may construct a packet header, such as L2 and/or L3 headers, from the notification and control information and load the packet data portion with the packet data in the D cells.

PIC 220 may receive the packet from L unit 234 and transmit it on a transmission medium, such as a WAN [act 1360]. PIC 220 may also encapsulate the packet in L1 protocol information before sending it out on the WAN.

Exemplary Output Logic Processing

Figure 14:
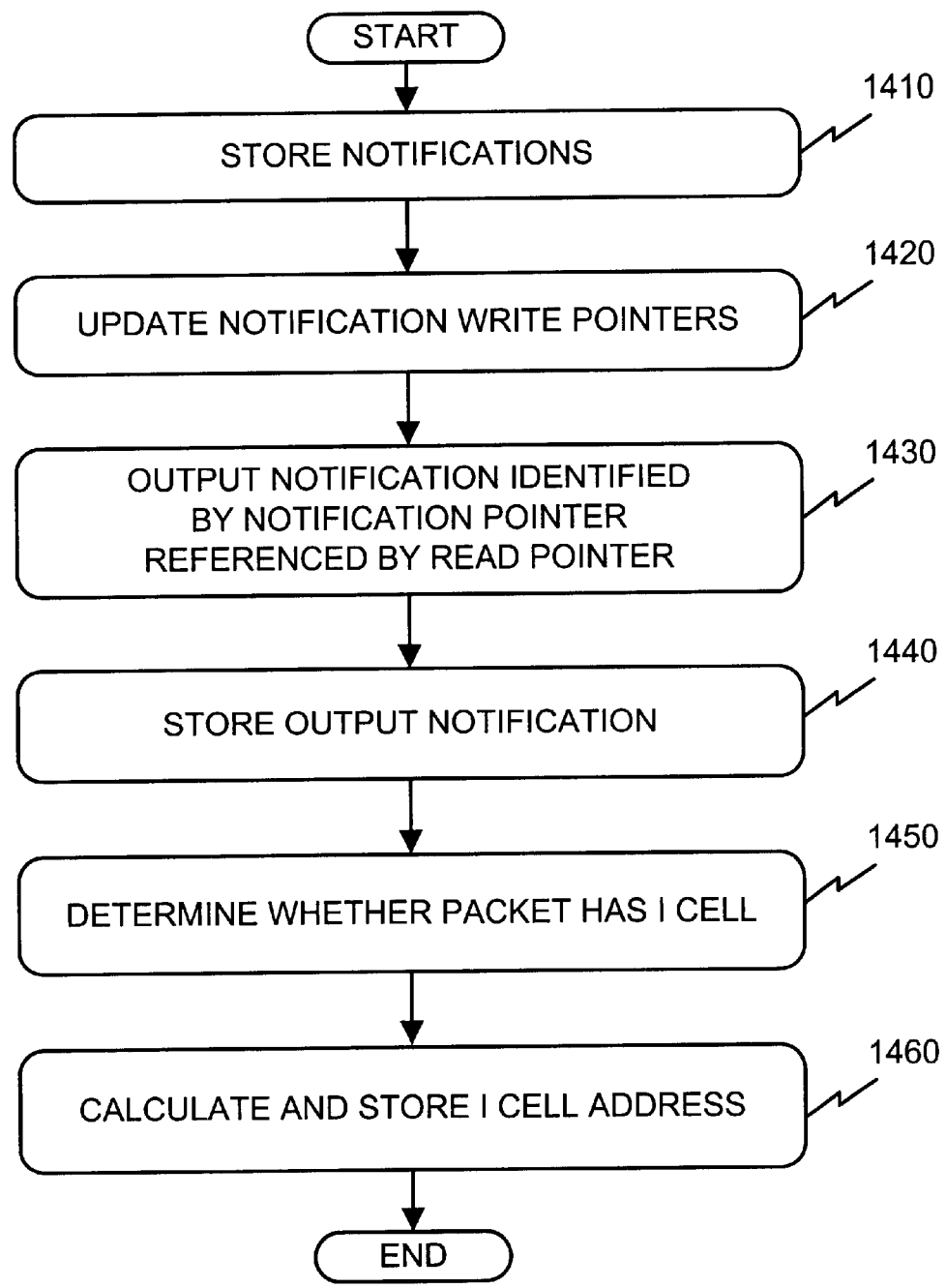
FIG. 14 is a flowchart of exemplary processing of notifications and I cells by output logic, such as the output logic of FIG. 6, according to an implementation consistent with the principles of the invention.

FIG. 14 is a flowchart of exemplary processing of notifications and I cells by output logic, such as by output logic 620 of first I/O logic 236 or second I/O logic 238, according to an implementation consistent with the principles of the invention. Processing may begin with notification buffer pool 710 (FIG. 7) storing notifications from memory 240 [act 1410]. The notifications correspond to individual packets of multiple packet streams and may be stored in notification buffer pool 710 in any particular order. The addresses of the notifications in notification buffer pool 710, however, may be stored, as notification pointers, in the appropriate FIFO buffer 810–830 (FIG. 8) in pointer queue 720 [act 1420]. The particular FIFO buffers 810–830 in which the notification pointers are stored may be determined based on the packet stream to which the corresponding packet belongs. Write pointers 850 determine the location at which the notification pointers are stored in FIFO buffers 810–830.

It is often important to assure that packets are transmitted by router 100 in the same order in which they were received. To maintain the order of the packets, the notification pointers may be stored in pointer queue 720 based on the order in which the corresponding packets were received by router 100. That is, the notification pointers of earlier-received packets may be stored in pointer queue 720 before notification pointers of later-received packets.

Pointer queue 720 may use read pointers 840 to identify the next notification pointers to process. Pointer queue 720 may use a read pointer 840 to identify a notification within notification buffer pool 710. Notification buffer pool 710 may output the identified notification to notification buffer 730 [act 1430]. Notification buffer 730 stores the notification in the appropriate FIFO buffer 910–930 [act 1440]. The appropriate FIFO buffer 910–930 may be identified based on the stream to which the packet corresponding to the notification belongs.

Output logic 620 may next determine whether the packet corresponding to the notification has one or more associated I cells [act 1450]. Output logic 620 may determine whether there are any I cells based on the state bit associated with the notification pointer in the pointer queue 720. State memory array 760 may also record information regarding the existence of I cells for a particular packet.

If the packet includes I cells, the address of the first I cell may be calculated and stored in the appropriate FIFO buffer 1010–1030 within I cell address buffer 740 [act 1460]. The appropriate FIFO buffer 1010–1030 may be identified based on the stream to which the packet corresponding to the notification belongs. The address of the first I cell stored in FIFO buffer 1010–1030 may be determined as a function of the addresses within the notification. For example, the first I cell address may be determined by:

address of first data cell+offset of first I cell (from notification)+1.

When the I cell address reaches the front of FIFO buffer 1010–1030, I cell address buffer 740 may issue a read request to memory 240 to retrieve the I cell and any related I cells. As shown in FIG. 5, multiple I cells may be linked together to form a linked list. The retrieved I cells from memory 240 may be stored in the appropriate FIFO buffer 1110–1130 within prefetched I cell buffer 750. The appropriate FIFO buffer 1110–1130 may be identified based on the stream to which the packet, corresponding to the I cells, belongs.

Figure 15:
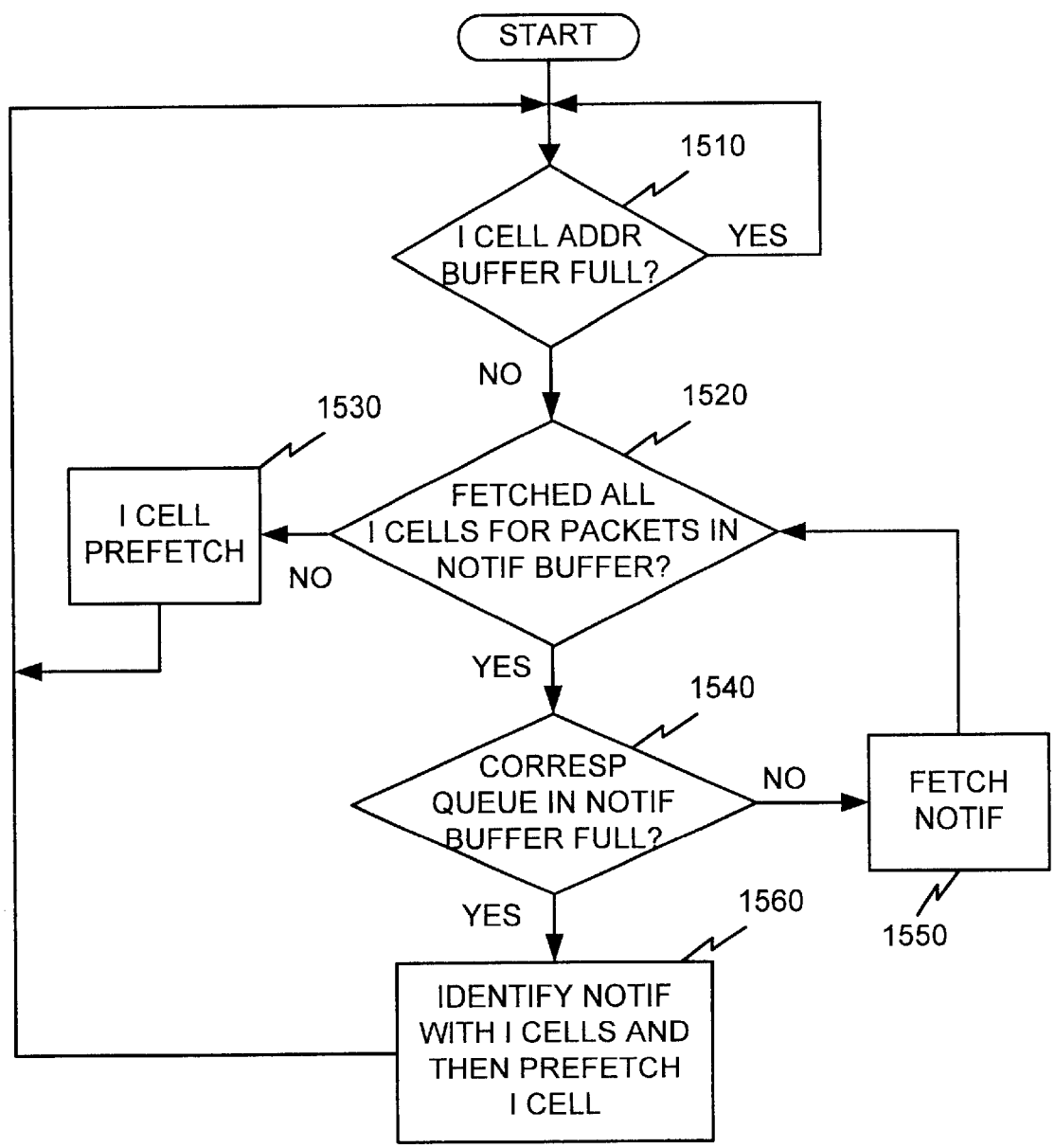
FIG. 15 is a flowchart of exemplary prefetching of I cells by the output logic of FIG. 6.

I cell address buffer 740 may also prefetch I cells for notifications that have not yet reached the notification queue within notification buffer 730. FIG. 15 is a flowchart of exemplary processing for fetching and prefetching I cells according to implementations consistent with principles of the invention. I cell address buffer 740 determines whether its I cell queues are full and, therefore, cannot store any additional I cell addresses [act 1510]. If an I cell queue is not full, I cell address buffer 740 may determine whether all of the I cells for packets with notifications stored in notification buffer 730 have been fetched [act 1520]. If all of the I cells have not been fetched, then I cell address buffer 740 prefetches them [act 1530].

If all of the I cells have been fetched, notification buffer 730 determines whether the corresponding notification queue is full and, therefore, cannot store any additional notifications [act 1540]. If the corresponding notification queue in notification buffer 730 is not full, notification buffer 730 may fetch the next notification [act 1550]. Processing may then return to act 1520, where I cell address buffer 740 may determine whether all of the I cells for packets with notifications stored in notification buffer 730 have been fetched.

If the corresponding notification queue in notification buffer 730 is full, however, I cell address buffer 740 retrieves an I cell address corresponding to the notification pointed to by prefetch pointer 860 (FIG. 8) in pointer queue 720 [act 1560]. I cell address buffer 740 may then issue a read request to memory 240 to prefetch the I cells.

When the I cells have been prefetched, the D cells associated with prefetched I cells are retrieved from memory 240 using the I cells stored in prefetched I cell buffer 750. During the time the I cells and their corresponding D cells are fetched, the D cells explicitly identified in the notification are also prefetched. Output logic 620 may then write the updated notifications into the D cells and forward the D cells.

EXAMPLE

The above processing may be clarified with an example. FIGS. 16A–16E provide an example of the processing described above with regard to FIG. 14. The elements shown in FIGS. 16A–16E correspond to the elements shown in FIG. 7. To simplify illustration, only queue one, corresponding to stream one, is illustrated.

Assume for purposes of this example, that the router 100 receives an input stream of packets comprising seven packets: P1, P2, S1, S2, S3, P3, and P4. Packets P1–P4 are large packets with I cells. Packets S1–S3 are small packets without I cells. Assume further that notification pointers for the packets have been stored in a FIFO buffer in the pointer queue.

Figure 16A:
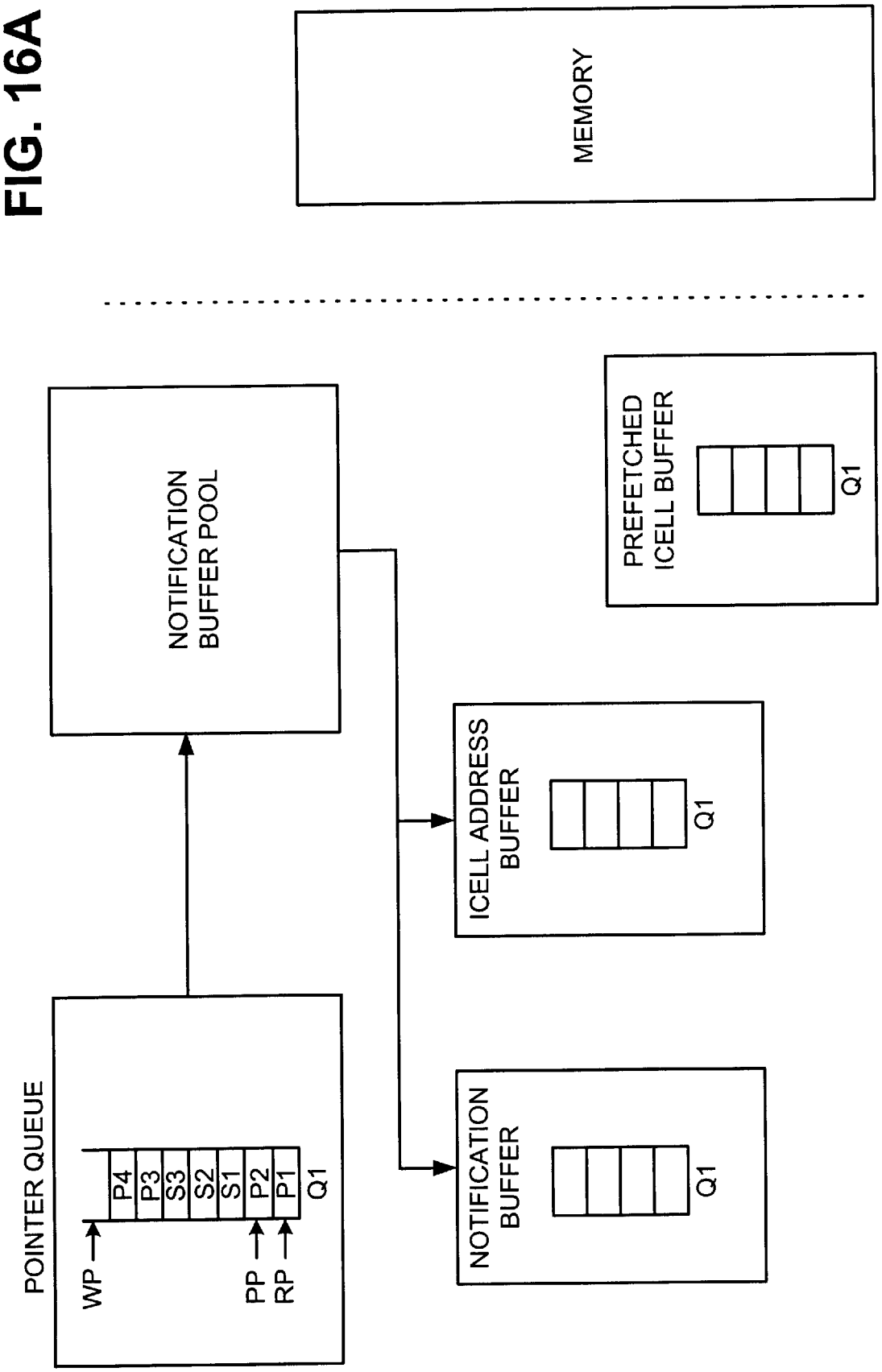
FIGS. 16A–16E provide an example of the processing described above with regard to FIG. 14.

In FIG. 16A, the pointer queue stores the packets in a FIFO buffer corresponding to the stream. At this point, the read pointer (RP) in the pointer queue references packet P1, the prefetch pointer (PP) references the packet P2 (i.e., the next large packet), and the write pointer (WP) references the next available location in the pointer queue.

Figure 16B:
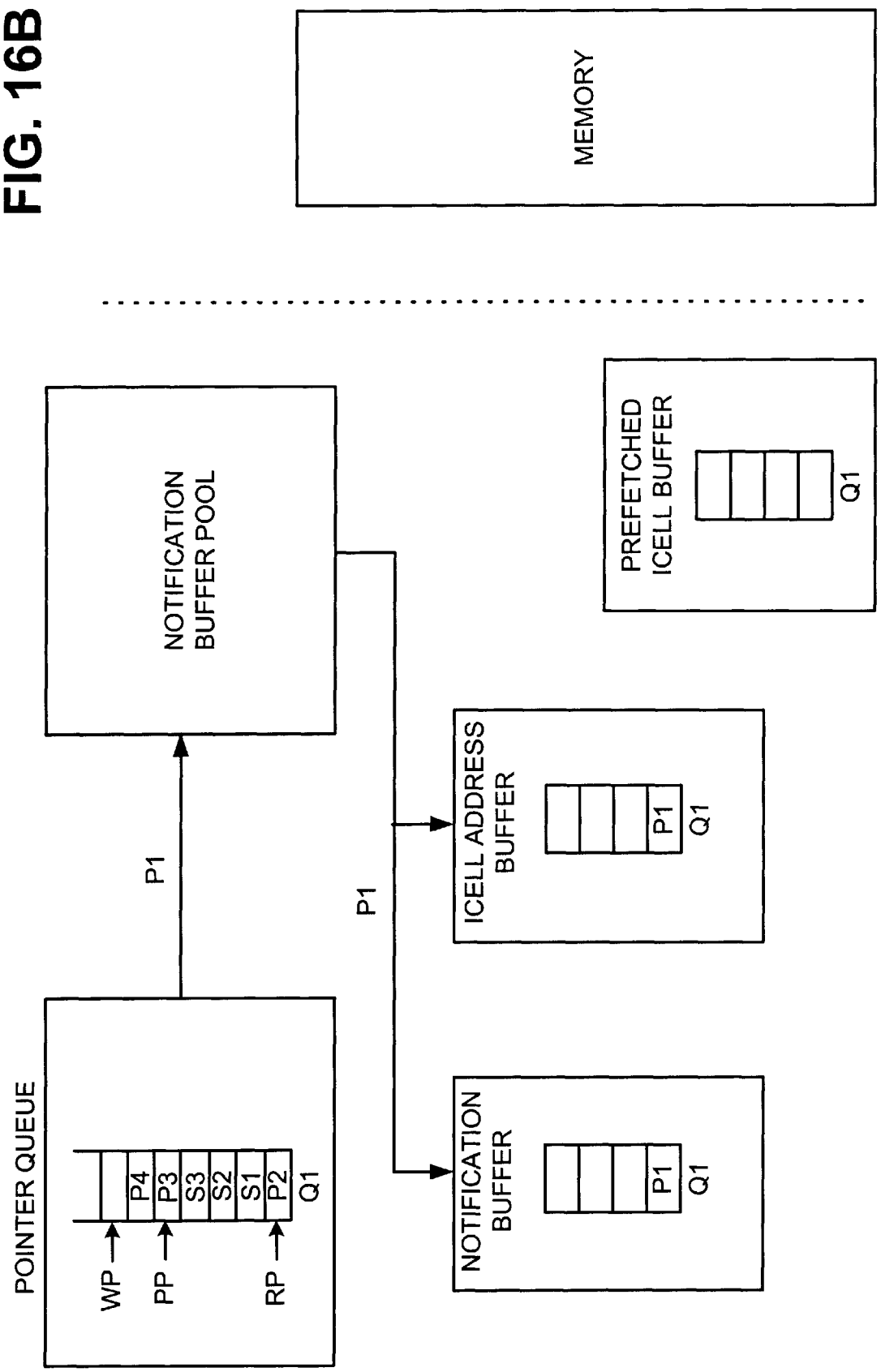

In FIG. 16B, the pointer queue issues a read request to the notification buffer pool for the packet P1. The pointer queue may then update the read, prefetch, and write pointers. The read pointer references the packet P2, the prefetch pointer references the packet P3 (i.e., the next large packet), and the write pointer references the next available location in the pointer queue. When updating the prefetch pointer, the pointer queue skips over packets without I cells (i.e., packets S1, S2, and S3). The pointer queue may determine whether a particular packet has one or more associated I cells based on the state bit stored with the notification pointer.

The pointer queue uses the notification pointer for the packet P1 to identify a notification within the notification buffer pool. The notification buffer pool outputs the notification identified for the packet P1 to the notification buffer and an I cell address is calculated and stored in the I cell address buffer. The notification buffer stores the notification in the next available location in the FIFO buffer corresponding to the stream. The I cell address stored in the I cell address buffer is determined from the information in the notification. For example, the I cell address may be calculated based on the address of the first data cell, which is stored in the notification, plus an I cell address offset stored in the notification plus one. The I cell address buffer stores the I cell address in the next available location in the FIFO buffer corresponding to the stream.

Figure 16C:
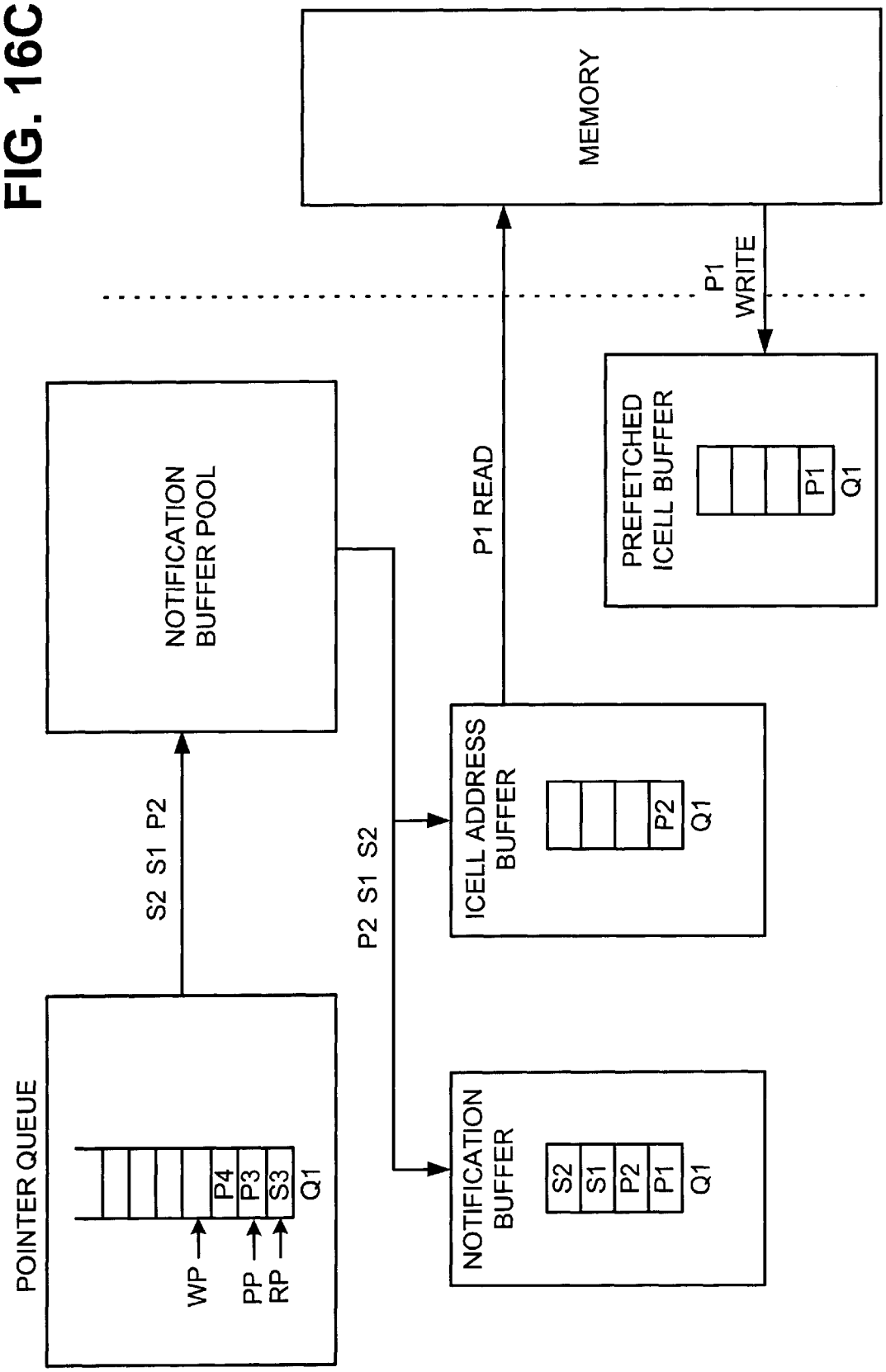

In FIG. 16C, the I cell address buffer issues a read request to retrieve the corresponding I cells from the memory for packet P1. The pointer queue may also issue read requests to the notification buffer pool for subsequent packets, such as packets P2, S1, and S2. The pointer queue may then update the read, prefetch, and write pointers accordingly. The read pointer now references the packet S3, the prefetch pointer references the packet P3, and the write pointer references the next available location in the pointer queue.

The pointer queue uses the notification pointers for the packets P2, S1, and S2 to identify notifications within the notification buffer pool. The notification buffer pool outputs the notifications identified for the packets P2, S1, and S2 to the notification buffer and an I cell address for packet P2 to the I cell address buffer. The notification buffer stores the notifications in available locations in the FIFO buffer corresponding to the stream. The I cell address buffer stores an I cell address for packet P2, but not for packets S1 or S2 because these packets do not have associated I cells. The I cell address buffer stores the I cell address for packet P2 in the next available location in the FIFO buffer corresponding to the stream.

Figure 16D:
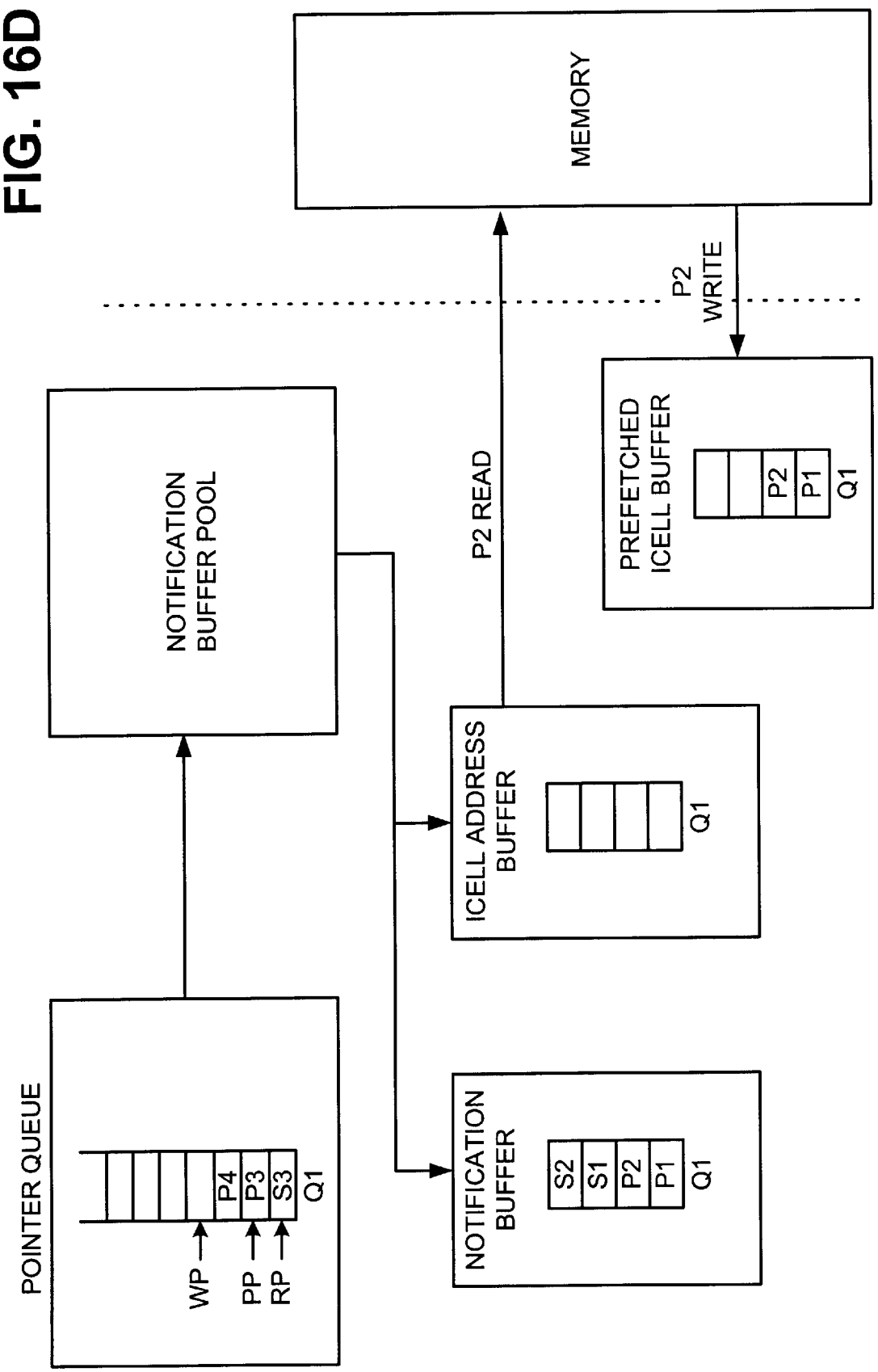

In FIG. 16D, the I cell address buffer is empty. Upon detecting this state, the output logic determines whether the corresponding notification buffer queue is full. If the queue is full, as is the case in FIG. 16D, the output logic proceeds to prefetch the next I cells from the stream.

To prefetch the next I cells for the stream, the output logic determines the next notification in the pointer queue having I cells, which is the location pointed to by prefetch pointer PP. The I cell address is prefetched from the notification in notification buffer pool, and queued to the empty I cell address queue in the I cell address buffer. In the example shown in FIG. 16D, packet P3 is the next packet in the pointer queue having a notification which indicates it has I cells and is thus pointed to by prefetch pointer PP. The pointer queue then updates the prefetch pointer to point to packet P4.

Figure 16E:
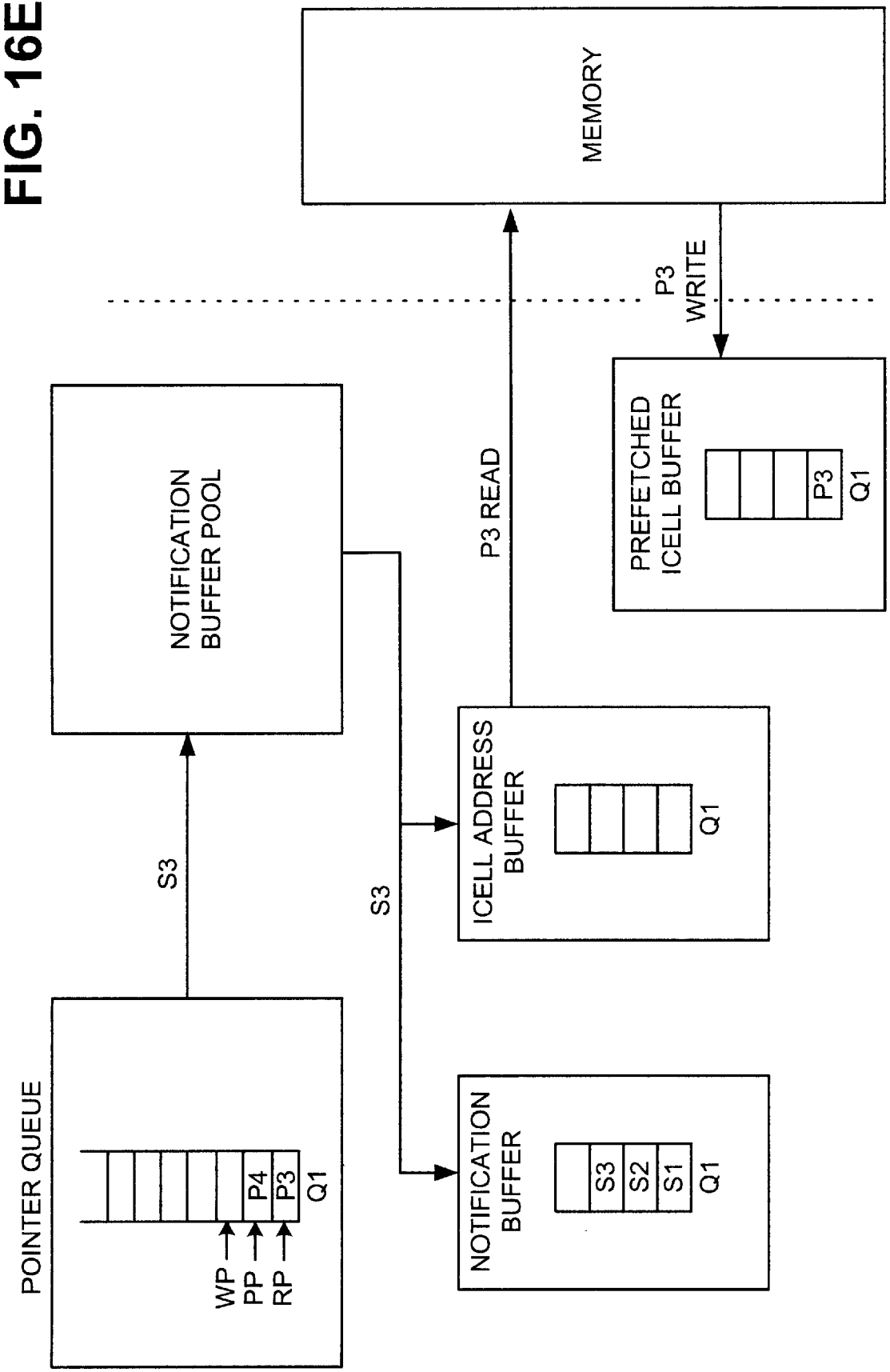

In FIG. 16E, packets P1 and P2 have been processed and therefore no longer appear in any buffers. The I cell address for packet P3 has already been retrieved from the notification in the notification buffer pool and stored in the I cell address buffer. The reading of I cells for packet P3 is underway, as indicated by the P3 read and P3 write notifications, and reading the notifications for packet P3 is also underway.

Figure 17A:
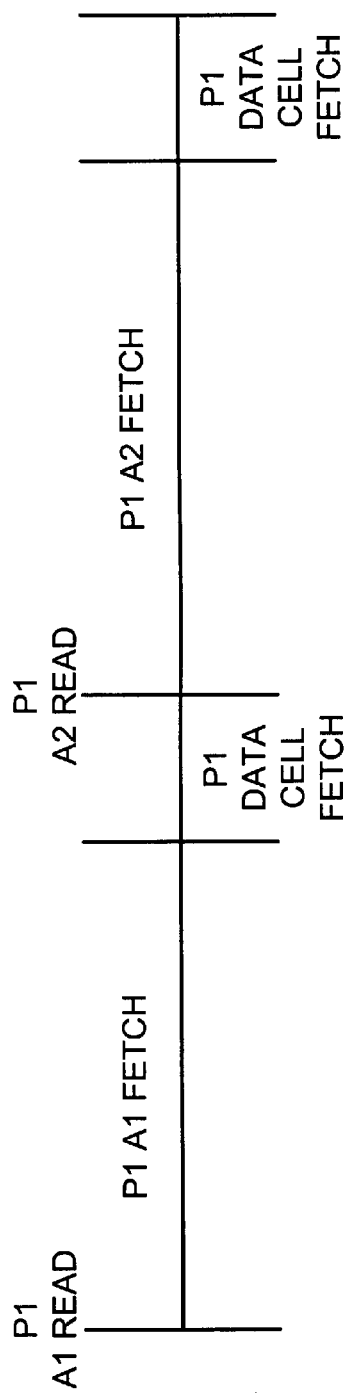
FIGS. 17A and 17B illustrate an exemplary timeline for fetching I cells and D cells from the memory according to an implementation consistent with the principles of the invention.
Figure 17B:
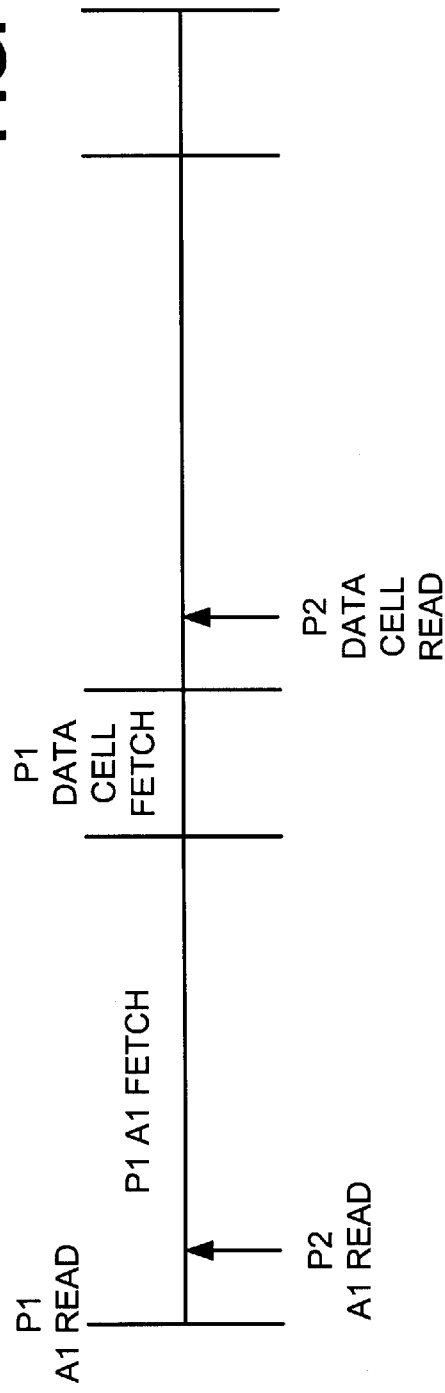

FIGS. 17A and 17B illustrate an exemplary timeline for fetching I cells and D cells from the memory according to an implementation consistent with the principles of the invention. FIG. 17A illustrates fetching for a single packet (P1). Briefly, an I cell read request is issued to the memory (indicated by P1 A1 READ). When the I cell is retrieved (via P1 A1 FETCH), the D cells identified by the I cell may be fetched (indicated by P1 DATA CELL FETCH). The next I cell read request for the packet may then be issued (indicated by P1 A2 READ). As illustrated by the timeline, the fetching of the I cells constitutes approximately 75% of the time spent retrieving I cells and D cells.

Systems and methods consistent with the principles of the invention permit the I cells for multiple packets to be fetched concurrently. FIG. 17B illustrates a simple example of two concurrent fetching operations. Additional concurrent fetching operations may occur in other implementations consistent with the principles of the invention. As shown in FIG. 17B, an I cell read request may be issued for a packet (P2) (indicated by P2 A1 READ) after issuing the I cell read request for packet (P1) (indicated by P1 A1 READ). To maintain the order of the packets through the router 100, it may be necessary to commence I cell and D cell fetching operations (via, for example P1 A1 FETCH and P1 DATA CELL FETCH operations respectively) in the order in which the packets are received by the router 100.

CONCLUSION

Systems and methods, consistent with the principles of the invention, provide a two level prefetch process to increase the efficiency associated with the use of the memory in a network device. The network device concurrently prefetches I cells for multiple packets. The network device stores multiple notifications in a notification buffer pool with corresponding pointers in a pointer queue. Not all of the notifications have associated I cells. If a number of notifications without I cells arrive and fill the pointer queue, the network device uses a look ahead mechanism to locate the next notification in the pointer queue that has associated I cells, allocates space in an I cell address buffer for that notification, and issues a read request to memory to prefetch the I cell. The prefetched I cell is subsequently paired with the notification when it is dequeued from a notification buffer. This look ahead mechanism ensures that the benefits of prefetching I cells of multiple packets are maintained even for cases with several short packets (without I cells) between long packets (with I cells).

The network device also concurrently processes multiple packets. If the network device is constrained to fully transmit one packet before it can start transmitting the next packet, the network device may perform selective processes on subsequent packets. The network device allocates separate memory space for storing prefetched I cells and uses a prefetch mechanism to prefetch I cells from memory for multiple packets in a packet stream. This permits the network device to limit the effects of the large latency of the memory and, at the same time, maintain the packet order within the packet stream.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, systems and methods have been described for processing packets while maintaining the order of the processed packets within a network device. In other implementations consistent with the principles of the invention, the network device processes several packets in a packet stream in parallel without regard to their order. The network device may then use a reorder buffer to put the packets back in the order of their arrival.

In other implementations consistent with the invention, data and addresses are not stored in cells. Rather, data could be stored in any form that can be read out in preparation for transmitting a stream of data including the stored data. Similarly, the addresses can be stored in any form that can be read out and used to access data pointed to by the addresses.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A network device, comprising:
   a memory configured to store data and addresses corresponding to streams received by the network device, the addresses storing pointers to the data; and
   output logic configured to:
      determine whether one of the stored addresses is required to be fetched,
      when no stored address is required to be fetched, read data from the memory, and
      when one of the stored addresses is required to be fetched, fetch that address from the memory and read data from the memory using the fetched address.

2. The network device of claim 1, wherein when fetching an address from memory, the output logic is configured to concurrently fetch, from the memory, multiple addresses that correspond to one of the streams.

3. The network device of claim 1, wherein the output logic includes:
   a notification buffer pool configured to store notifications corresponding to the streams, and
   a pointer queue configured to identify ones of the notifications in the notification buffer pool to be processed.

4. The network device of claim 3, wherein each of the notifications includes packet information and a plurality of data addresses.

5. The network device of claim 3, wherein the pointer queue further includes:
   a read pointer that identifies a next one of the notifications in the notification buffer pool to be processed,
   a write pointer that identifies a next available location in the pointer queue to store a notification identifier, and
   a prefetch pointer that identifies a notification with one or more associated addresses to be prefetched.

6. The network device of claim 3, wherein the pointer queue includes a plurality of buffers, each of the buffers corresponding to one of the streams.

7. The network device of claim 6, wherein each of the buffers includes a plurality of entries, each of the entries storing a pointer that identifies a notification in the notification buffer pool and an indicator that indicates whether the identified notification has one or more associated addresses stored in the memory.

8. The network device of claim 3, wherein the output logic further includes:
   a notification buffer configured to store notifications from the notification buffer pool that are identified by the pointer queue, and
   an address buffer configured to store pointers to the addresses stored in the memory that correspond to the notifications stored in the notification buffer.

9. The network device of claim 8, wherein the notification buffer includes a plurality of buffers, each of the buffers corresponding to one of the streams.

10. The network device of claim 8, wherein the address buffer includes a plurality of buffers, each of the buffers corresponding to one of the streams.

11. The network device of claim 10, wherein the pointer queue includes a prefetch pointer that identifies a notification that has one or more associated addresses to be prefetched; and
   wherein the address buffer is further configured to determine free space status in one of the plurality of buffers of the address buffer and store, in the one buffer, a pointer to an address that corresponds to the notification identified by the prefetch pointer in the pointer queue based on the free space status in the one buffer.

12. The network device of claim 1, wherein the output logic includes a prefetched address buffer configured to store the fetched address.

13. The network device of claim 12, wherein the prefetched address buffer includes a plurality of buffers, each of the buffers corresponding to one of the streams.

14. A method for processing streams in a network device, comprising:

storing data and addresses corresponding to the streams received by the network device, the addresses storing pointers to the data;

determining whether one of the stored addresses is required to be fetched;

when no stored address is required to be fetched, reading stored data; and when one of the stored addresses is required to be fetched, fetching the one stored address and reading stored data using the fetched address.

15. The method of claim 14, wherein the fetching of the one stored address includes:

concurrently fetching a plurality of stored addresses that correspond to one of the streams.

16. The method of claim 15, further comprising:

storing notifications for each of the streams, each of the notifications including packet information and a plurality of data addresses.

17. The method of claim 16, further comprising:

reading stored data using the data addresses included in a notification.

18. The method of claim 14, further comprising:

prefetching at least one of the stored addresses prior to a normal time scheduled for fetching the at least one stored address.

19. The method of claim 14, wherein each of the streams includes a plurality of packets of different sizes; and wherein the determining whether one of the stored addresses is required to be fetched includes:

determining that one of the stored addresses is required to be fetched for packets of a first size, and determining that no stored address is required to be fetched for packets of a second size.

20. A network device, comprising:

a memory configured to store data and addresses corresponding to a plurality of input streams received by the network device, the addresses storing pointers to the data;

a notification buffer pool configured to store notifications corresponding to the input streams;

a pointer queue configured to identify ones of the notifications in the notification buffer pool to be processed, the pointer queue including a prefetch pointer that identifies a notification that has one or more associated addresses stored in the memory;

a notification buffer configured to store notifications from the notification buffer pool that are identified by the pointer queue; and an address buffer configured to:

store a pointer to an address in the memory that corresponds to a notification stored in the notification buffer, determine free space status of the address buffer, and store a pointer to an address in the memory that corresponds to the notification identified by the prefetch pointer in the pointer queue.

21. The network device of claim 20, wherein each of the notifications includes packet information and a data address.

22. The network device of claim 20, wherein the pointer queue further includes a plurality of buffers, each of the buffers corresponding to one of the input streams.

23. The system network device of claim 22, wherein each of the buffers includes a plurality of entries, each of the entries being configured to store a pointer that identifies a notification in the notification buffer pool and an indicator that indicates whether the identified notification has one or more associated addresses stored in the memory.

24. The network device of claim 20, wherein the pointer queue further includes:

a read pointer that identifies a next one of the notifications in the notification buffer pool to be processed, and a write pointer that identifies a next available location in the pointer queue to store a notification identifier.

25. The network device of claim 20, wherein the notification buffer includes a plurality of buffers, each of the buffers corresponding to one of the input streams.

26. The network device of claim 20, wherein the address buffer includes a plurality of buffers, each of the buffers corresponding to one of the input streams.

27. The network device of claim 20, further comprising a prefetched address buffer configured to retrieve addresses from the memory that are identified by pointers stored in the address buffer.

28. The network device of claim 27, wherein the prefetched address buffer is further configured to concurrently retrieve addresses from the memory.

29. The network device of claim 27, wherein the address buffer includes a plurality of buffers, each of the buffers corresponding to one of the input streams.

30. A method for processing streams by a network device, comprising:

storing data and addresses corresponding to a plurality of input streams received by the network device, the address storing pointers to the data;

storing, in a notification buffer pool, notifications corresponding to the input streams;

storing notification pointers that identify ones of the notifications in the notification buffer pool to be processed;

providing one or more prefetch pointers that identify one or more of the notification pointers that identify notifications that have an associated stored address;

storing, in a notification buffer, notifications from the notification buffer pool that are identified by the notification pointers;

storing address pointers to the stored addresses that correspond to the notifications stored in the notification buffer;

determining whether any additional address pointers can be stored; and storing one or more address pointers to the addresses associated with the notifications and corresponding to the one or more prefetch pointers when additional address pointers can be stored.

31. A network device, comprising:

a memory configured to store data cells and address cells corresponding to a plurality of packets of different size in a plurality of input streams received by the network device, at least some of the data cells having associated address cells, the address cells storing pointers to the data cells; and output logic configured to:
    determine whether a packet has an associated address cell,
    prefetch address cells from the memory for packets having associated address cells, and
    read data cells from the memory using the prefetched address cells.

32. Apparatus for retrieving transmission data, comprising:
    a memory configured to store data for transmission and addresses identifying data for transmission; and
    output logic including an address buffer configured to store at least one pointer to the addresses, the output logic being configured to:
        initiate processes for reading transmission data from the memory,
        transfer a first pointer to the address buffer, the first pointer being associated with an initiated process for reading transmission data from the memory,
        read from the memory one of the addresses using the first pointer from the address buffer, and
        read the data identified by the one address from the memory.

33. The apparatus of claim 32, wherein the output logic is further configured to transfer a second pointer to the address buffer, the second pointer being associated with a process waiting to be initiated for reading transmission data.

34. The apparatus of claim 33, further comprising a prefetch pointer for identifying a pointer to the second pointer.

35. The apparatus of claim 34, further comprising:
    a read pointer for identifying information to be used by a waiting process for reading transmission data; and
    a write pointer for identifying a next location for storing information to be used by a waiting process for reading transmission data;
    wherein the prefetch pointer is maintained between the read pointer and write pointer.

36. The apparatus of claim 32, further comprising:
    a buffer for storing information for an initiated process, the information identifying transmission data to be read out of the memory.

37. The apparatus of claim 36, wherein the information identifying the transmission data to be read out comprises:
    an address identifying the data, and
    a pointer identifying that address.

38. The apparatus of claim 32, further comprising a buffer for storing information identifying transmission data to be read out for processes waiting to be initiated.

39. The apparatus of claim 38, wherein the information identifying the transmission data to be read out comprises:
    an address identifying the data, and
    a pointer identifying that address.

40. A method for retrieving transmission data, comprising:
    storing data for transmission and addresses identifying data for transmission;
    storing in an address buffer at least one pointer to the addresses;
    initiating processes for reading out transmission data;
    transferring a first pointer to the address buffer, the first pointer being associated with an initiated process for reading transmission data from memory;
    reading from the memory one of the addresses using the first pointer from the address buffer; and
    reading the data identified by the one address from the memory.

41. The method of claim 40, further comprising:
    transferring a second pointer to the address buffer, the second pointer being associated with a process waiting to be initiated for reading transmission data.

42. The method of claim 41, further comprising:
    identifying a pointer to the second pointer.

43. The method of claim 42, further comprising:
    identifying information to be used by a waiting process for reading transmission data; and
    identifying a next location for storing information to be used by a waiting process for reading data.

44. The method of claim 40, further comprising:
    storing information for an initiated process, the information identifying transmission data to be read out of the memory.

45. The method of claim 44, wherein the information identifying the transmission data to be read out comprises:
    an address identifying the data, and
    a pointer identifying that address.

46. The method of claim 40, further comprising:
    storing information identifying transmission data to be read out for processes waiting to be initiated.

47. The method of claim 46, wherein the information identifying the transmission data to be read out comprises:
    an address identifying the data, and
    a pointer identifying that address.

* * * * *